United States Patent
Mogi

(10) Patent No.: US 9,753,262 B2
(45) Date of Patent: Sep. 5, 2017

(54) ZOOM LENS AND IMAGING APPARATUS HAVING THE SAME

(71) Applicant: CANON KABUSHIKI KAISHA, Tokyo (JP)

(72) Inventor: Shuichi Mogi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/607,924

(22) Filed: Jan. 28, 2015

(65) Prior Publication Data

US 2015/0219882 A1 Aug. 6, 2015

(30) Foreign Application Priority Data

Jan. 31, 2014 (JP) ................................. 2014-017755

(51) Int. Cl.
*G02B 15/14* (2006.01)
*H04N 5/232* (2006.01)
*G02B 15/173* (2006.01)

(52) U.S. Cl.
CPC ........... *G02B 15/14* (2013.01); *G02B 15/173* (2013.01); *H04N 5/23212* (2013.01); *H04N 5/23296* (2013.01)

(58) Field of Classification Search
USPC ....................................................... 359/676
See application file for complete search history.

(56) References Cited

U.S. PATENT DOCUMENTS

2014/0211029 A1   7/2014   Okumura

FOREIGN PATENT DOCUMENTS

| CN | 1721903 A | 1/2006 |
|---|---|---|
| CN | 101086552 A | 12/2007 |
| CN | 103969812 A | 8/2014 |
| JP | 2012-47814 A | 3/2012 |

*Primary Examiner* — Jack Dinh

(74) *Attorney, Agent, or Firm* — Canon U.S.A., Inc. IP Division

(57) ABSTRACT

A zoom lens includes a focus lens group having a negative refractive power. The focus lens group is configured to move during focusing. In the zoom lens, a distance between lens groups arranged adjacent to each other changes for zooming and/or focusing. In the zoom lens, a positive lens group having a positive refractive power is provided. The positive lens group is arranged adjacent to the focus lens group on an image side thereof. The positive lens group moves during zooming. The focus lens group includes, in order from an object side to an image side, a positive lens and a negative lens. In the zoom lens, a curvature radius of an image-side surface of the positive lens included in the focus lens group and a curvature radius of an object-side surface of the negative lens included in the focus lens group are each set appropriately.

22 Claims, 21 Drawing Sheets

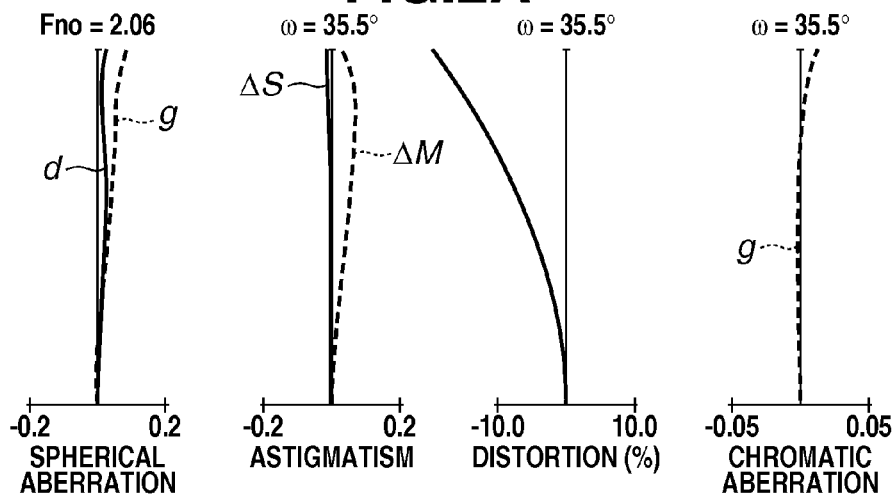
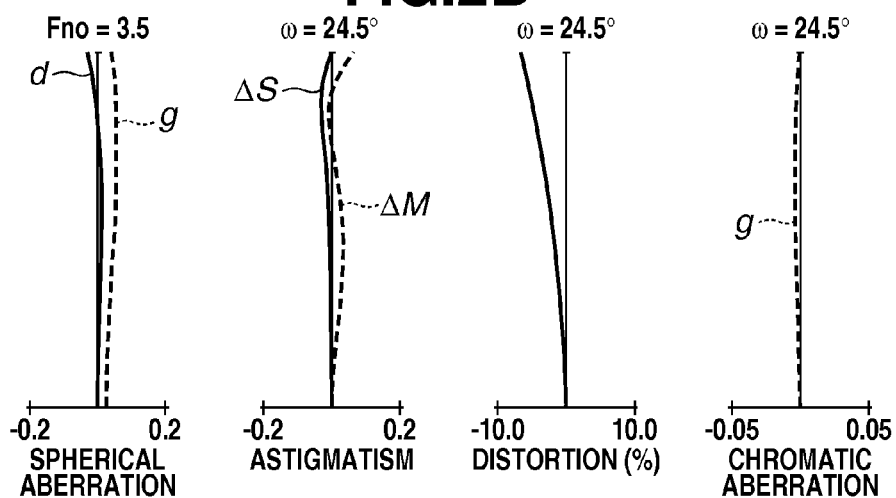
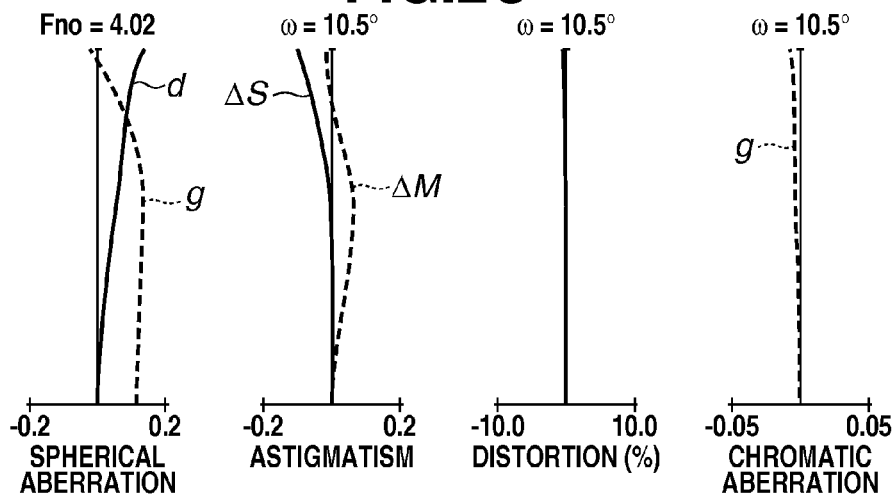

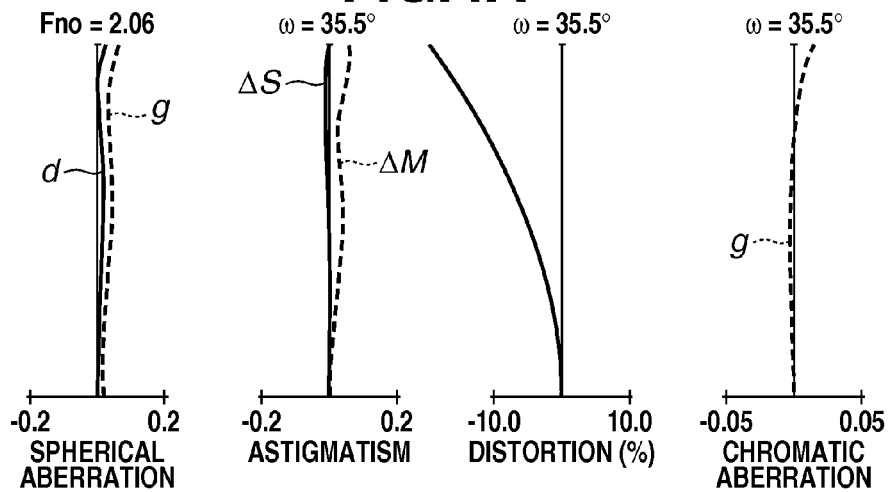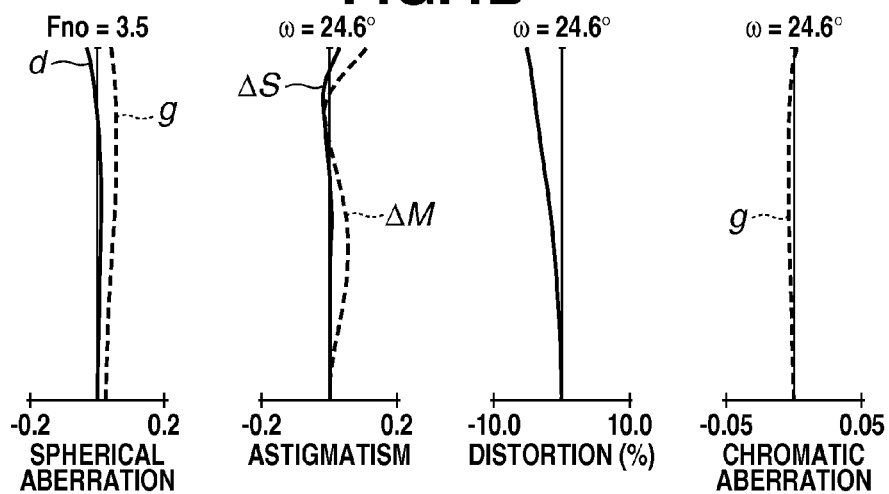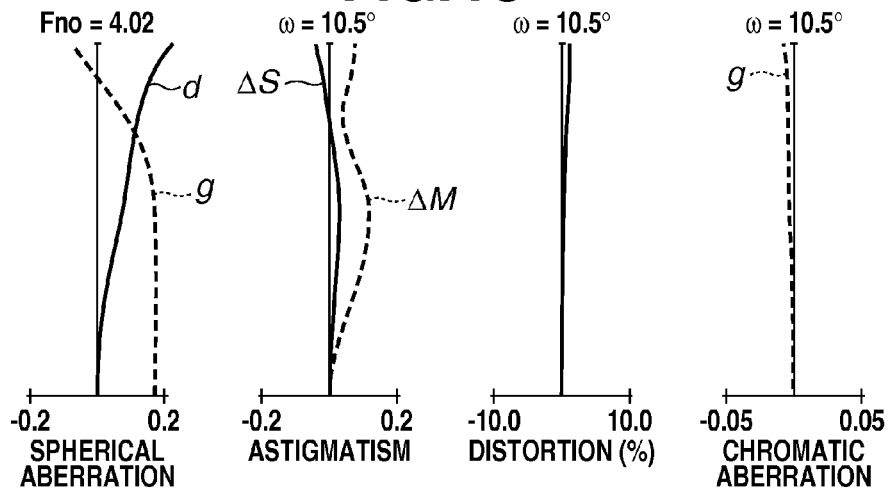

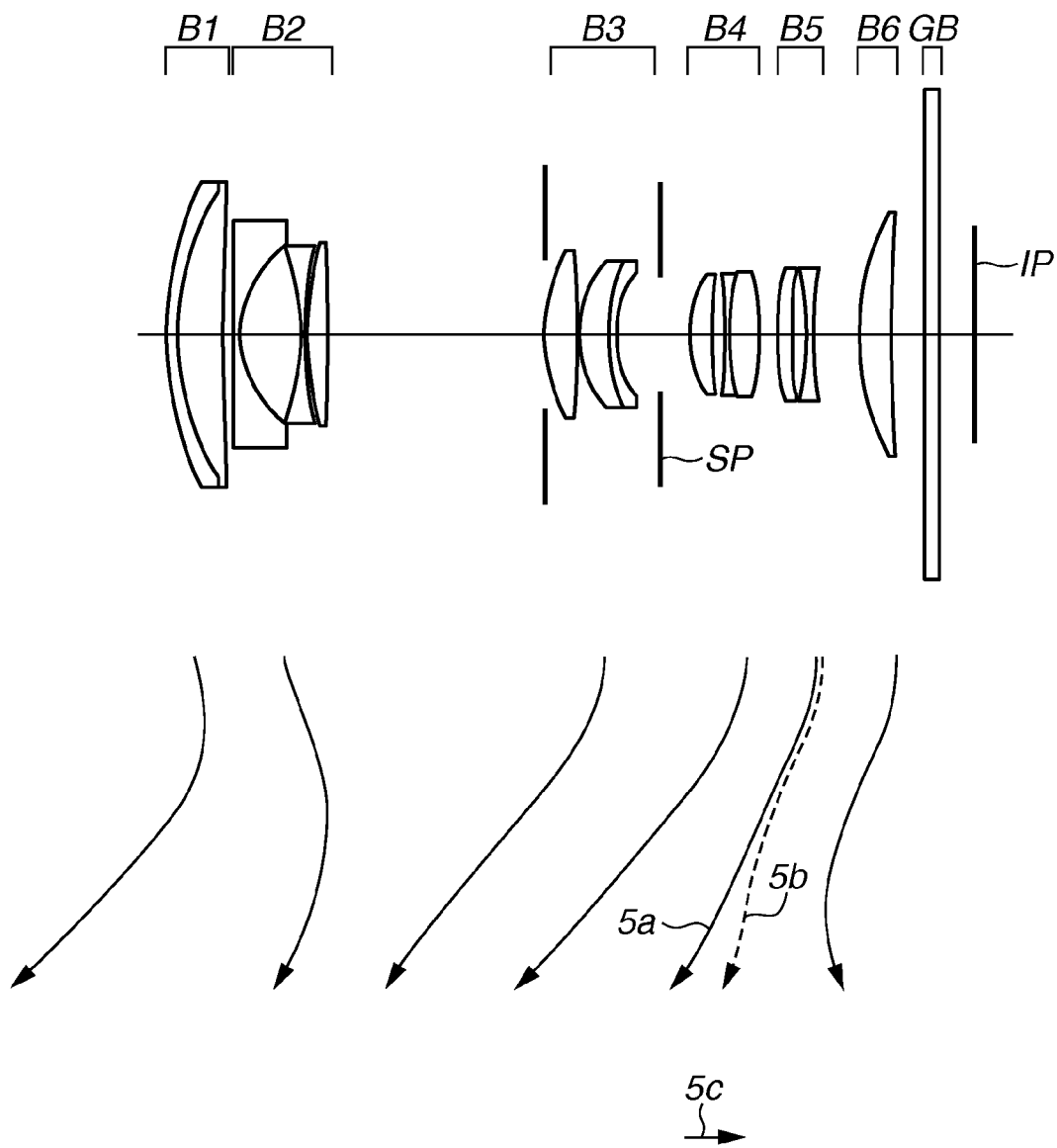

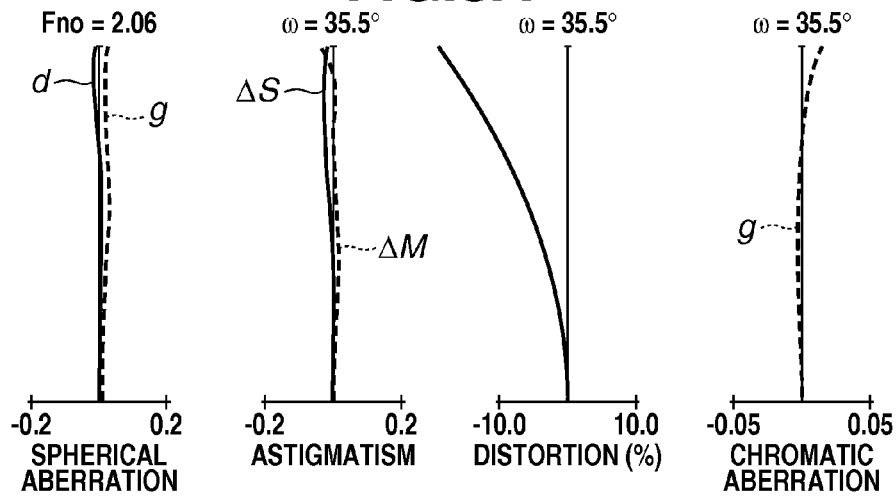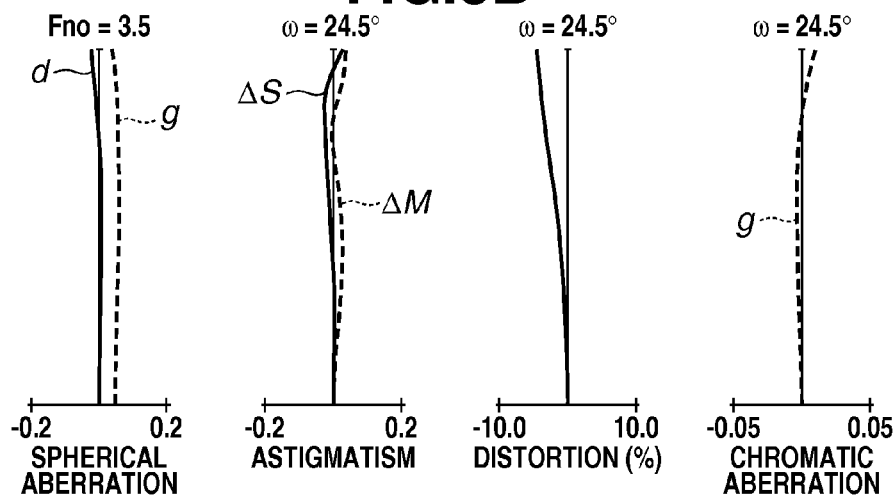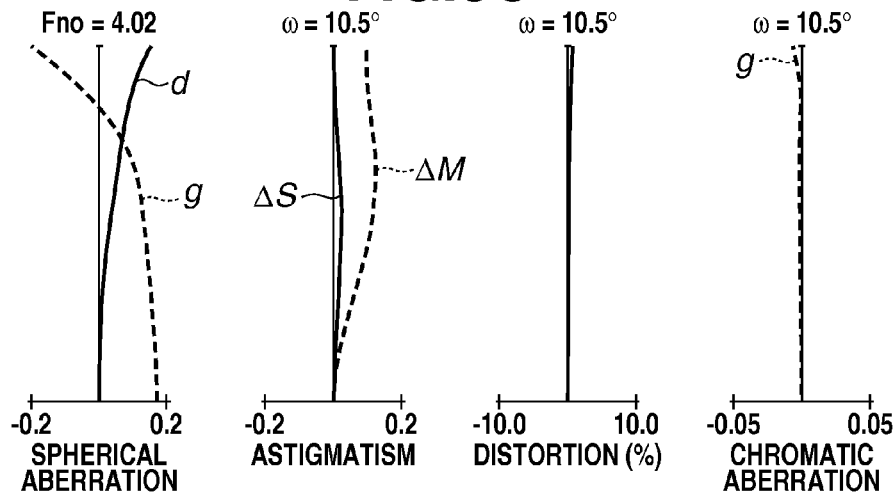

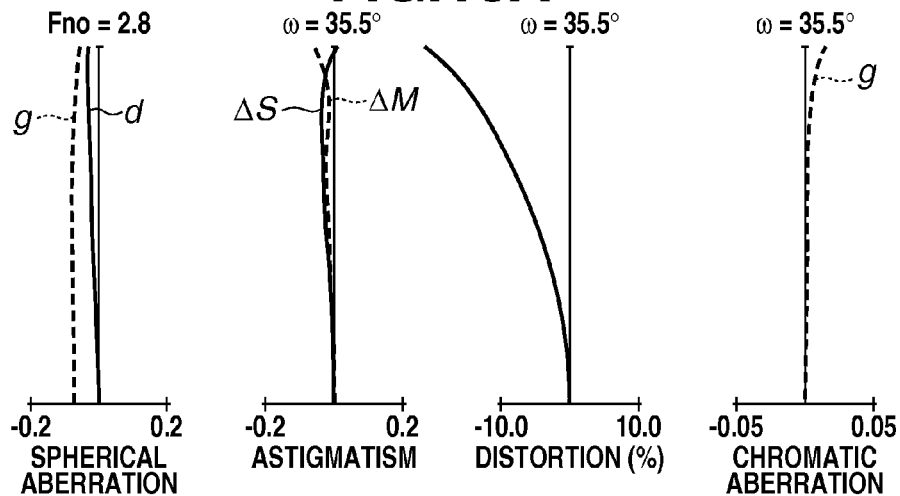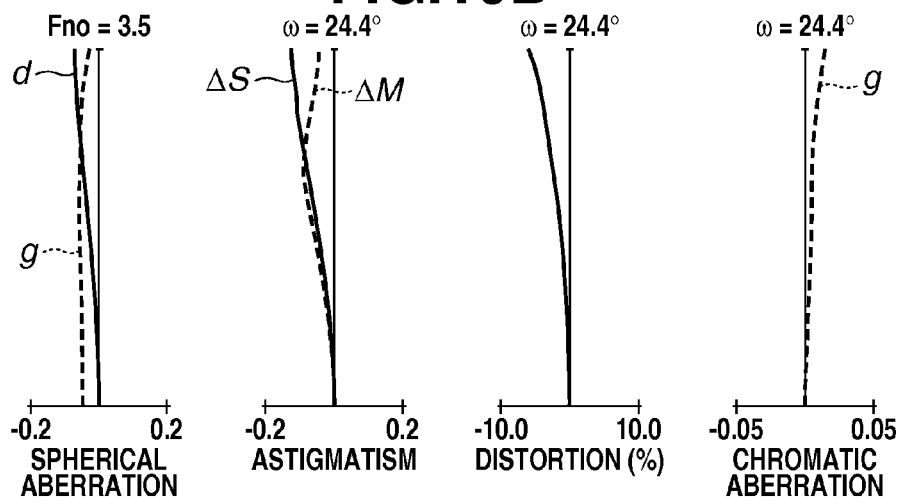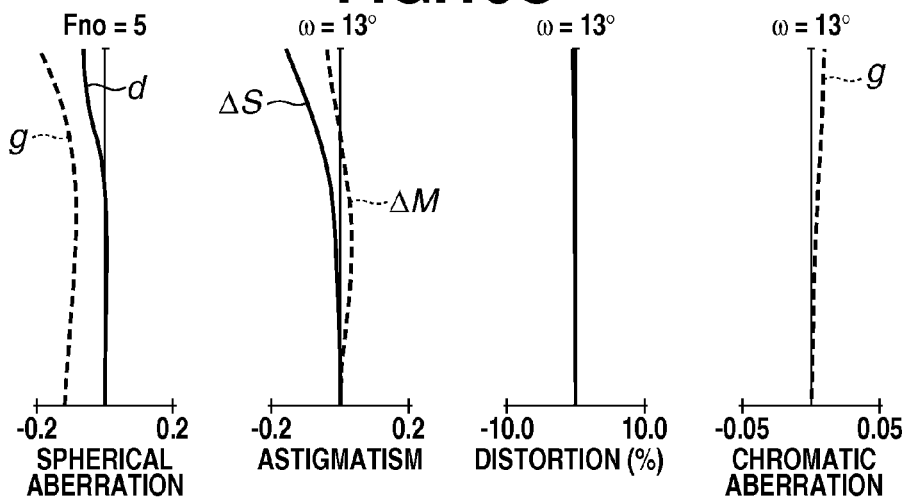

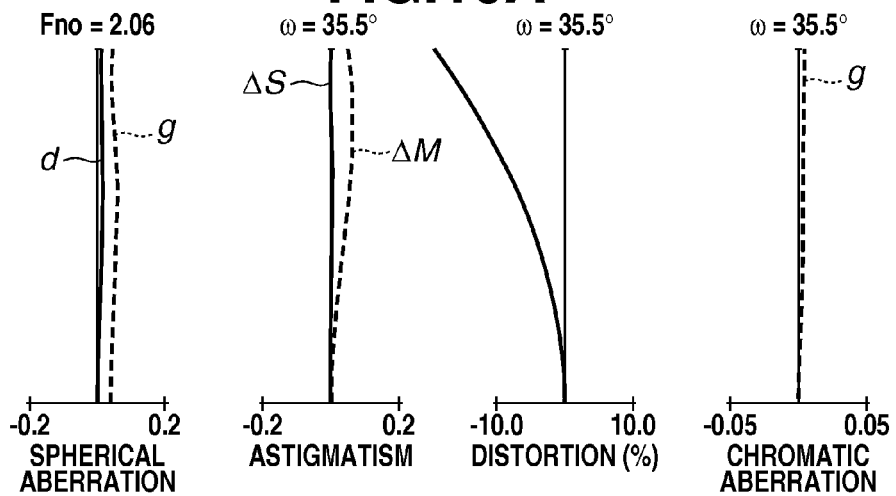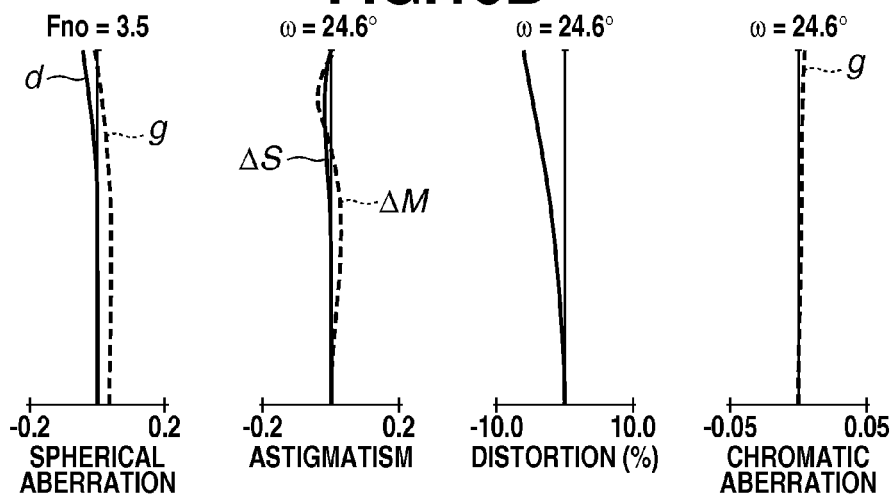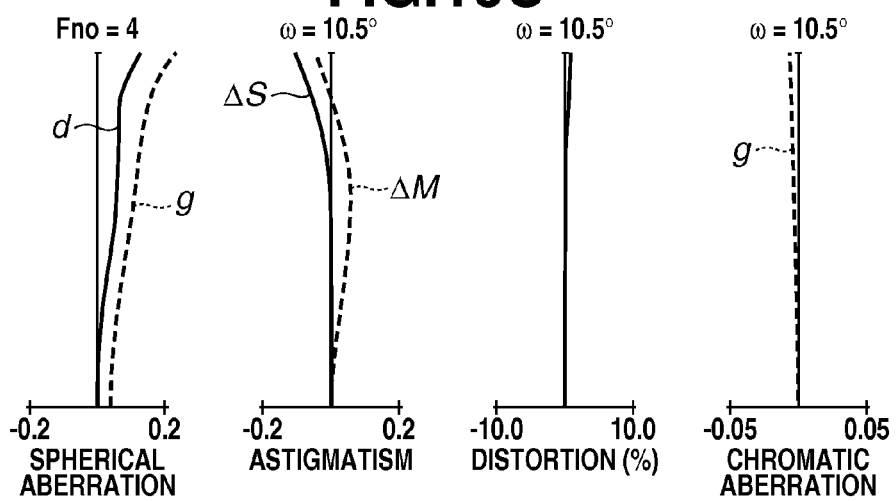

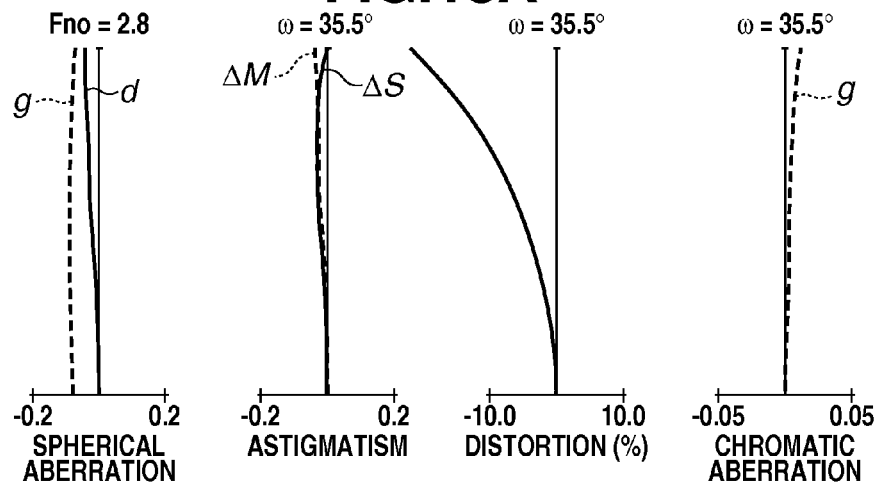
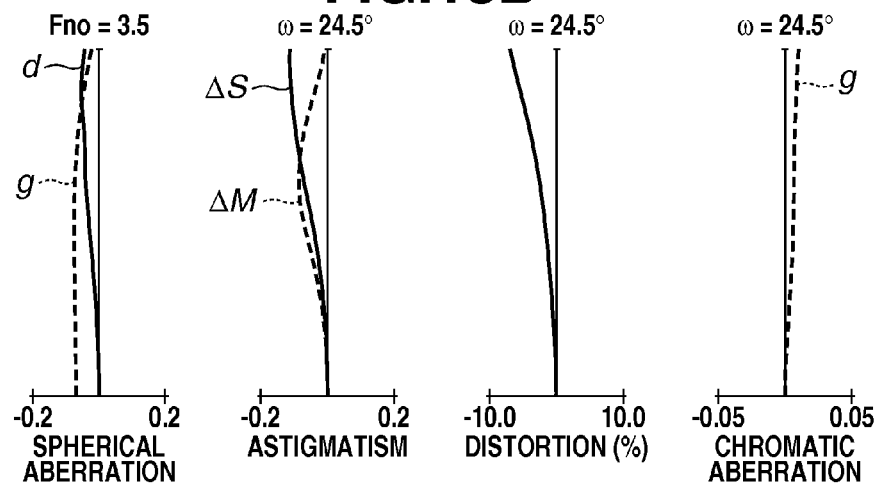
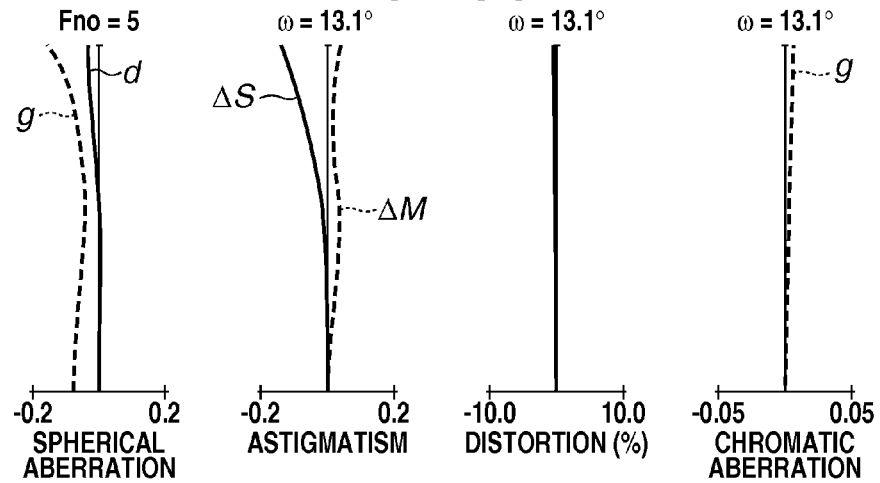

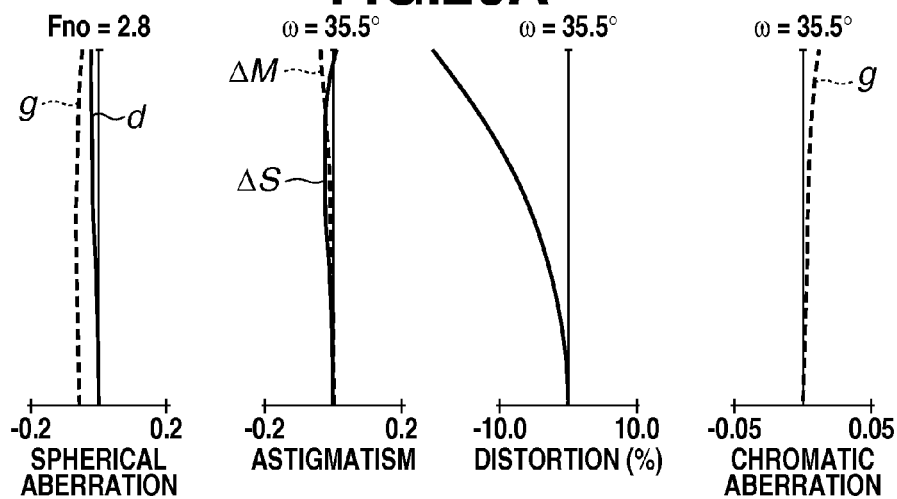
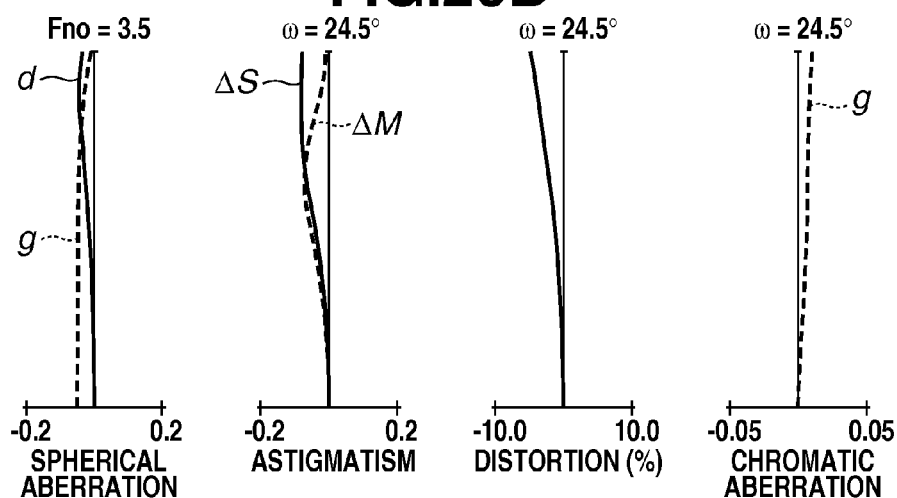
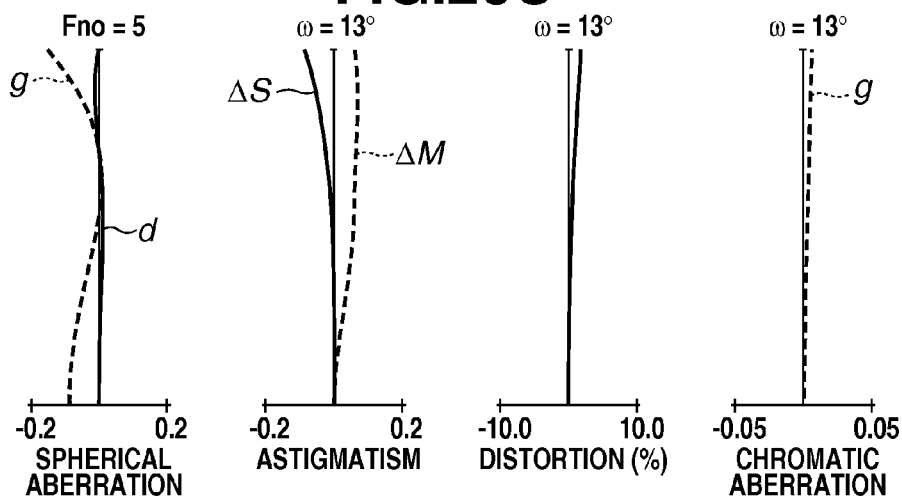

ZOOM LENS AND IMAGING APPARATUS HAVING THE SAME

BACKGROUND OF THE INVENTION

Field of the Invention

The present inventions relate to at least one zoom lens and at least one imaging apparatus including the at least one zoom lens. The at least one zoom lens is suitable for an imaging apparatus in which an image sensor is used, such as, but not limited to, a digital still camera, a video camera, a monitoring camera, and a broadcasting camera. The at least one zoom lens is also suitable for an imaging apparatus such as a camera using silver-halide photographic film.

Description of the Related Art

Recently, an imaging apparatus employing a solid-state image sensor, such as a digital still camera and a video camera, has been high-functionalized, and the entire size thereof has been reduced. A zoom lens used in such an imaging apparatus is required to be short in total lens length and high in resolution.

In a zoom lens discussed in Japanese Patent Application Laid-Open No. 2012-47814, a plurality of lens groups located on an image side relative to an aperture diaphragm moves during focusing. In the zoom lens, by using a plurality of lens groups for focusing, a refractive power of each focus lens group is relatively weakened.

Generally, to obtain an imaging optical system having a high resolution, it is important to determine an appropriate configuration in a focus lens group in the imaging optical system.

If a focus lens group is not properly configured, it is difficult to satisfactorily prevent the occurrence of an aberration variation caused by focusing.

SUMMARY OF THE INVENTION

According to at least one aspect of the present inventions, at least one embodiment of a zoom lens includes a focus lens group having a negative refractive power. The focus lens group is configured to move during focusing. In the at least one zoom lens, a distance between lens groups arranged adjacent to each other changes for zooming and/or focusing. In the at least one zoom lens, a positive lens group having a positive refractive power is provided. The positive lens group is arranged adjacent to the focus lens group on an image side thereof. In the at least one zoom lens, the focus lens group includes, in order from an object side to an image side, a positive lens and a negative lens. In the at least one zoom lens, an absolute value of a curvature radius of an object-side surface of the negative lens included in the focus lens group is smaller than an absolute value of a curvature radius of an image-side surface of the positive lens included in the focus lens group. According to other aspects of the present inventions, other zoom lenses and imaging apparatuses for use with the same are discussed herein.

Further features of the present inventions will become apparent from the following description of exemplary embodiments with reference to the attached drawings.

BRIEF DESCRIPTION OF THE DRAWINGS

FIGS. 2A, 2B, and 2C are aberration diagrams of the zoom lens according to the first exemplary embodiment of the present invention(s), at the wide-angle end, a middle zoom position, and a telephoto end, respectively.

FIGS. 4A, 4B, and 4C are aberration diagrams of the zoom lens according to the second exemplary embodiment of the present invention(s), at the wide-angle end, a middle zoom position, and a telephoto end, respectively.

FIG. 5 is a lens cross-sectional view of a zoom lens according to a third exemplary embodiment of the present invention(s), at a wide-angle end.

FIGS. 8A, 8B, and 8C are aberration diagrams of the zoom lens according to the fourth exemplary embodiment of the present invention(s), at the wide-angle end, a middle zoom position, and a telephoto end, respectively.

FIGS. 10A, 10B, and 10C are aberration diagrams of the zoom lens according to the fifth exemplary embodiment of the present invention(s), at the wide-angle end, a middle zoom position, and a telephoto end, respectively.

FIGS. 16A, 16B, and 16C are aberration diagrams of the zoom lens according to the eighth exemplary embodiment of the present invention(s), at the wide-angle end, a middle zoom position, and a telephoto end, respectively.

FIGS. 18A, 18B, and 18C are aberration diagrams of the zoom lens according to the ninth exemplary embodiment of the present invention(s), at the wide-angle end, a middle zoom position, and a telephoto end, respectively.

FIGS. 20A, 20B, and 20C are aberration diagrams of the zoom lens according to the tenth exemplary embodiment of the present invention(s), at the wide-angle end, a middle zoom position, and a telephoto end, respectively.

DESCRIPTION OF THE EMBODIMENTS

Various exemplary embodiments, features, and aspects of a zoom lens and an imaging apparatus including the zoom lens will be described in detail below with reference to the attached drawings. The zoom lens according to at least one embodiment of the present invention(s) includes a focus lens group configured to move during focusing. The focus lens group has a negative refractive power. Also, a positive lens group (a lens group having a positive refractive power) configured to move during zooming is arranged adjacent to the focus lens group on an image side thereof. In the zoom lens, a lens group is a lens element which moves integrally for zooming and/or focusing. Such a lens group includes at least one lens and may include more than one lens, but, in one or more embodiments, a lens group may include one lens. Additionally, a distance between lens groups arranged adjacent to each other (e.g., the focus lens group and the positive lens group, a plurality of lens groups in the zoom lens, adjacent lens groups among a plurality of lens groups in the zoom lens, adjacent pairs of lens groups among a plurality of lens groups in the zoom lens, etc.) changes for zooming and/or focusing.

Figure 1:
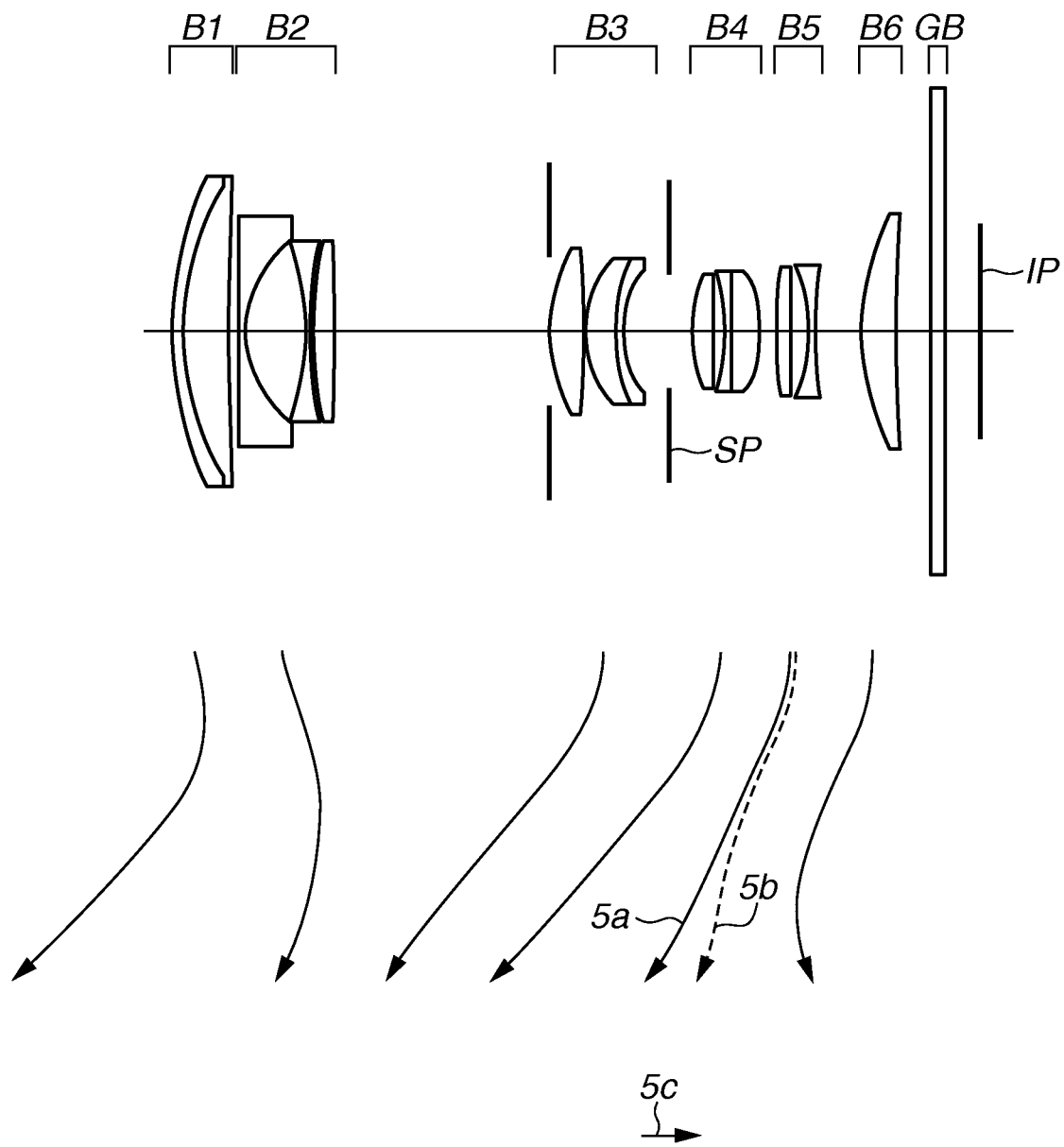
FIG. 1 is a lens cross-sectional view of a zoom lens according to a first exemplary embodiment of the present invention(s), at a wide-angle end.
Figure 3:
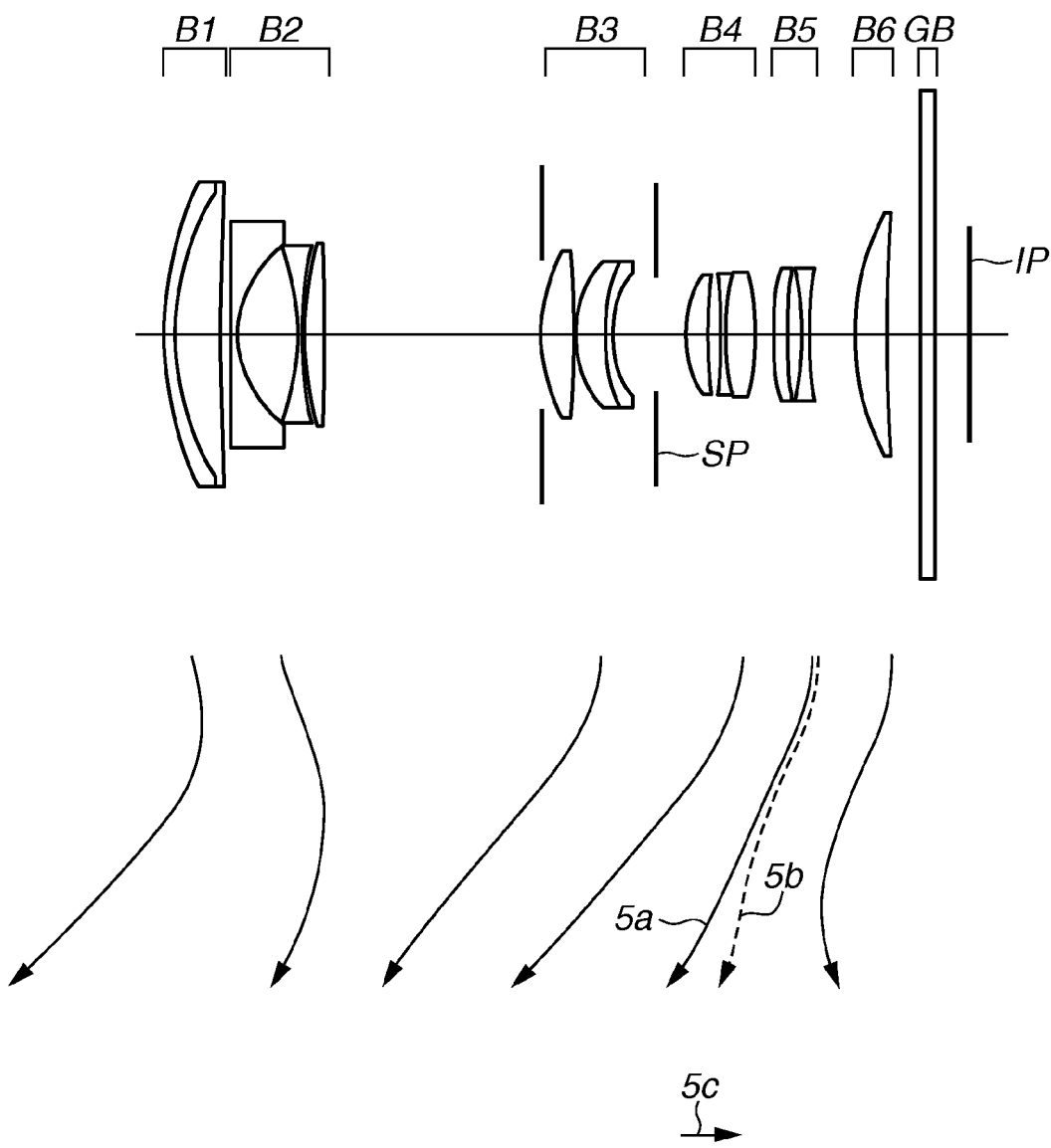
FIG. 3 is a lens cross-sectional view of a zoom lens according to a second exemplary embodiment of the present invention(s), at a wide-angle end.

FIG. 1 is a lens cross-sectional view of a zoom lens according to a first exemplary embodiment, at a wide-angle end. FIGS. 2A, 2B, and 2C are aberration diagrams of the zoom lens according to the first exemplary embodiment, at the wide-angle end, a middle zoom position, and a telephoto end, respectively. The zoom lens according to the first exemplary embodiment has a zoom ratio of approximately 4.72 and an aperture ratio of approximately 2.06 to 4.02. FIG. 3 is a lens cross-sectional view of a zoom lens according to a second exemplary embodiment, at a wide-angle end. FIGS. 4A, 4B, and 4C are aberration diagrams of the zoom lens according to the second exemplary embodiment, at the wide-angle end, a middle zoom position, and a telephoto end, respectively. The zoom lens according to the second exemplary embodiment has a zoom ratio of approximately 4.73 and an aperture ratio of approximately 2.06 to 4.02.

Figure 6A:
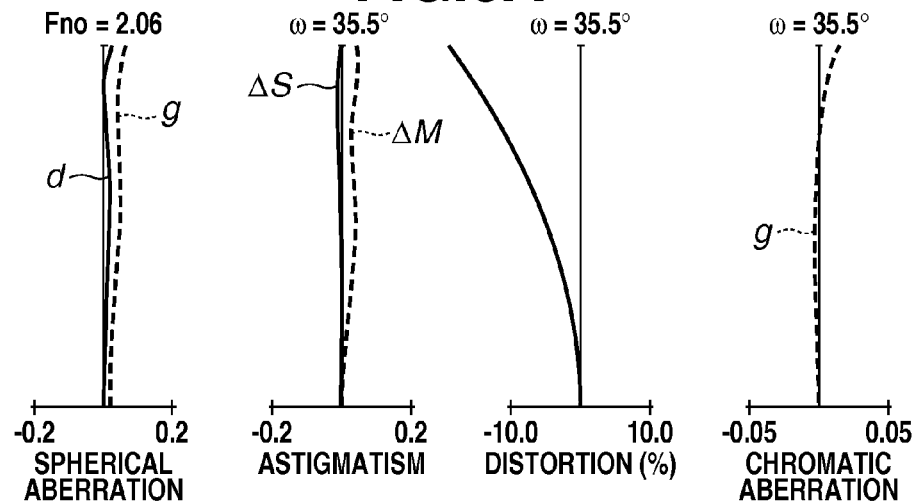
FIGS. 6A, 6B, and 6C are aberration diagrams of the zoom lens according to the third exemplary embodiment of the present invention(s), at the wide-angle end, a middle zoom position, and a telephoto end, respectively.
Figure 6B:
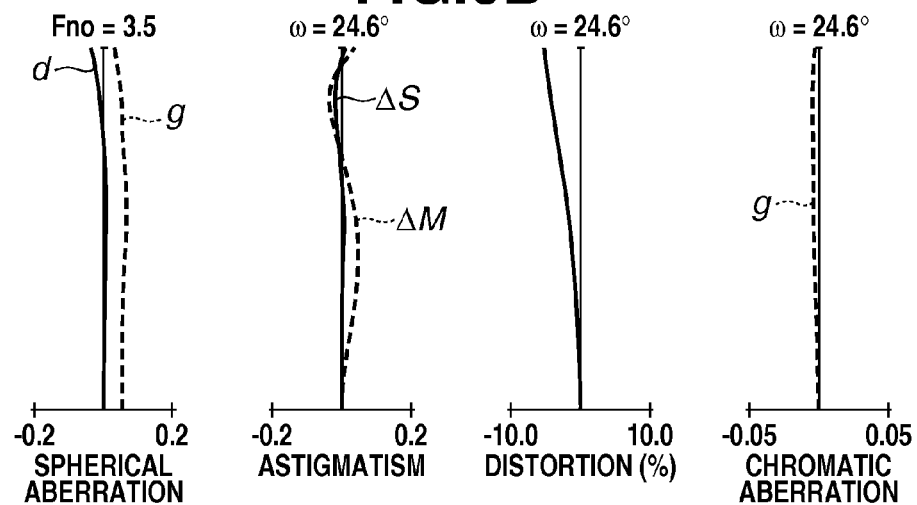
Figure 6C:
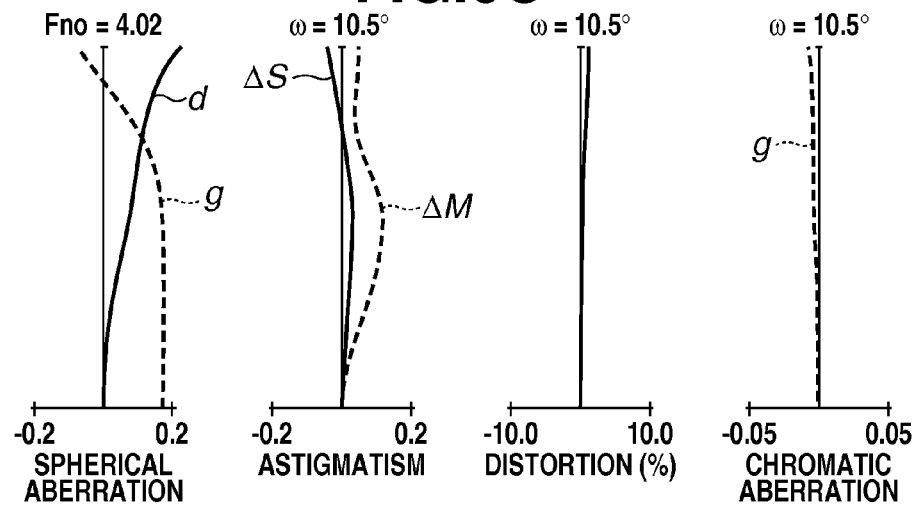
Figure 7:
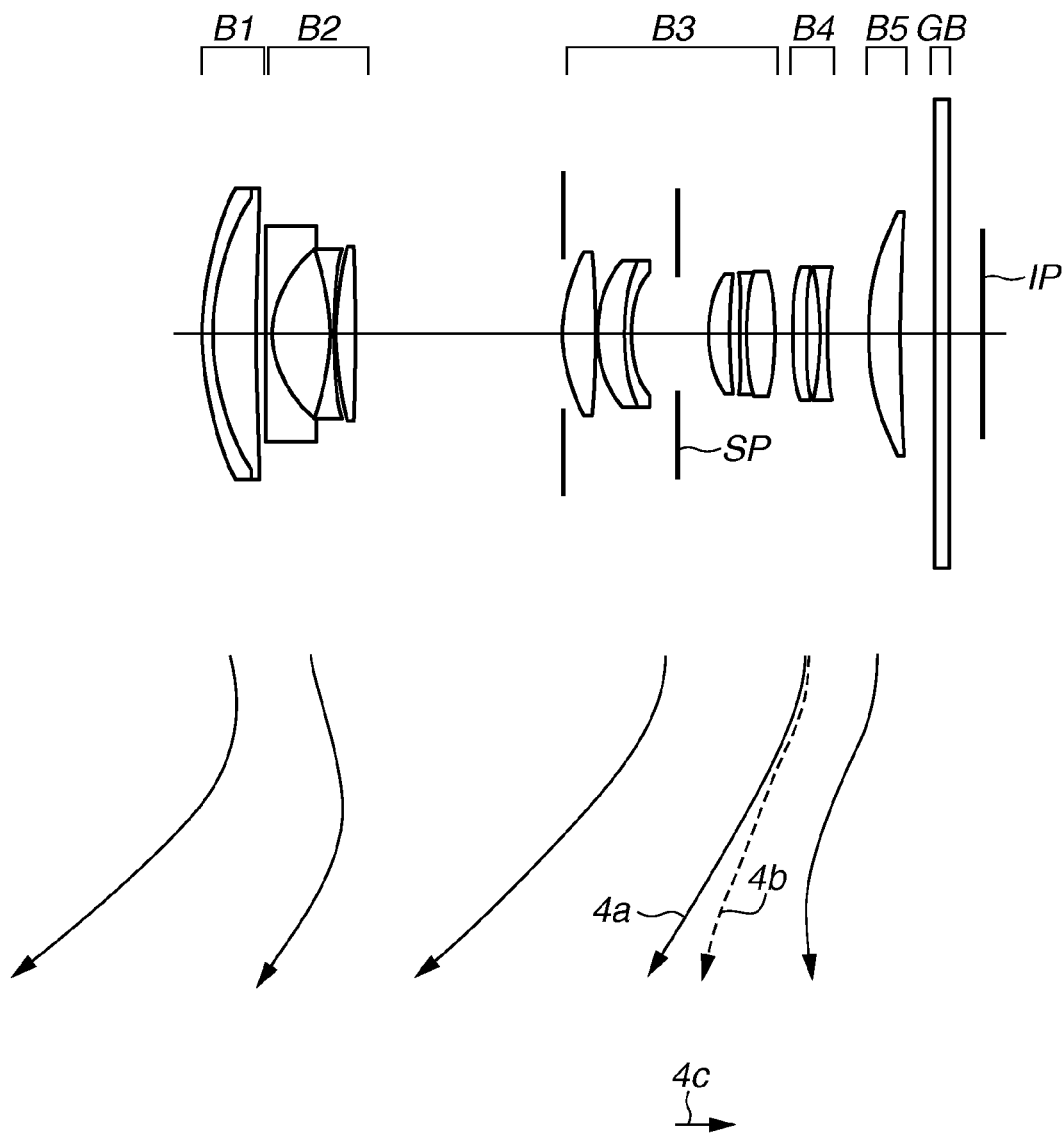
FIG. 7 is a lens cross-sectional view of a zoom lens according to a fourth exemplary embodiment of the present invention(s), at a wide-angle end.

FIG. 5 is a lens cross-sectional view of a zoom lens according to a third exemplary embodiment, at a wide-angle end. FIGS. 6A, 6B, and 6C are aberration diagrams of the zoom lens according to the third exemplary embodiment, at the wide-angle end, a middle zoom position, and a telephoto end, respectively. The zoom lens according to the third exemplary embodiment has a zoom ratio of approximately 4.73 and an aperture ratio of approximately 2.06 to 4.02. FIG. 7 is a lens cross-sectional view of a zoom lens according to a fourth exemplary embodiment, at a wide-angle end. FIGS. 8A, 8B, and 8C are aberration diagrams of the zoom lens according to the fourth exemplary embodiment, at the wide-angle end, a middle zoom position, and a telephoto end, respectively. The zoom lens according to the fourth exemplary embodiment has a zoom ratio of approximately 4.73 and an aperture ratio of approximately 2.06 to 4.02.

Figure 9:
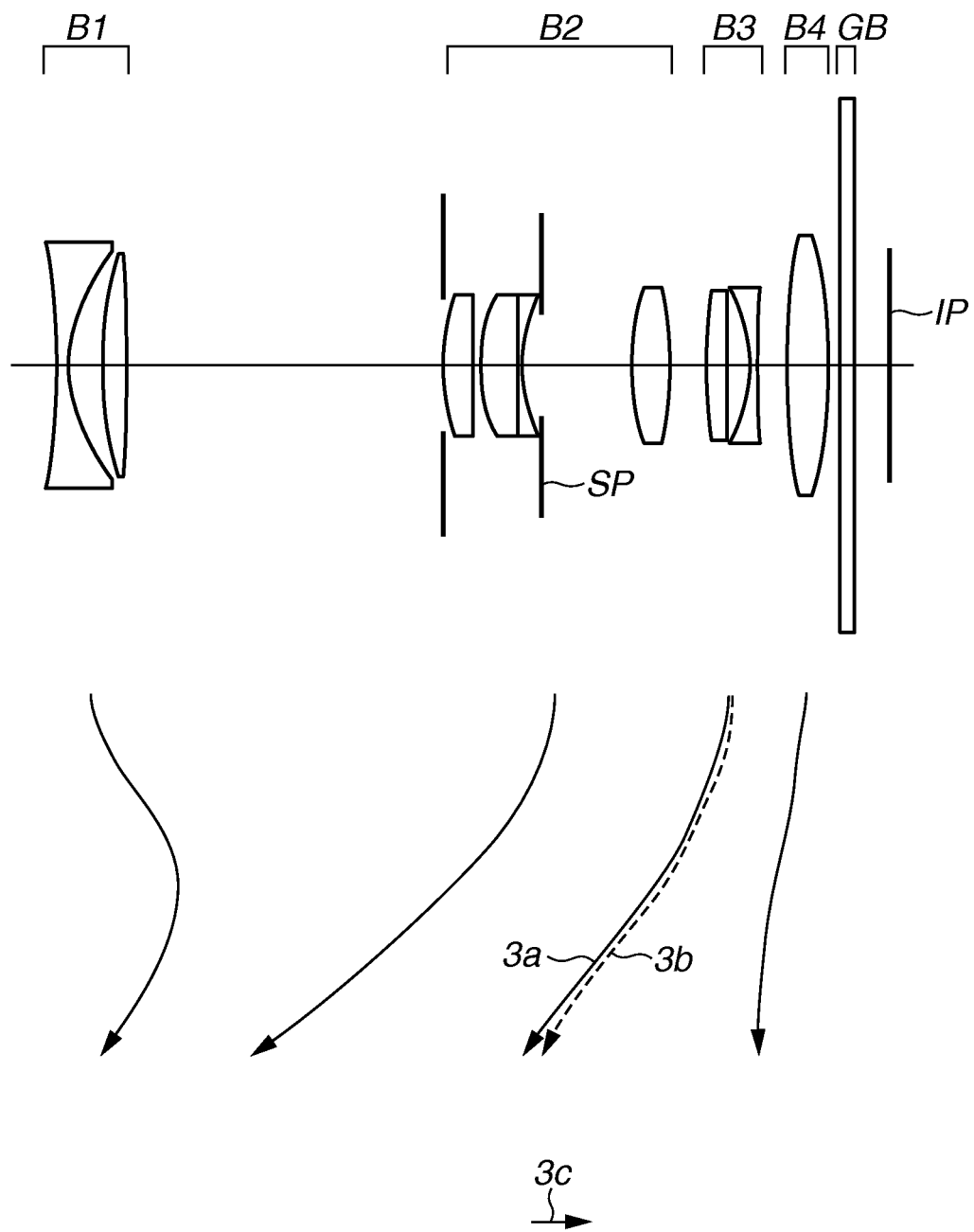
FIG. 9 is a lens cross-sectional view of a zoom lens according to a fifth exemplary embodiment of the present invention(s), at a wide-angle end.
Figure 11:
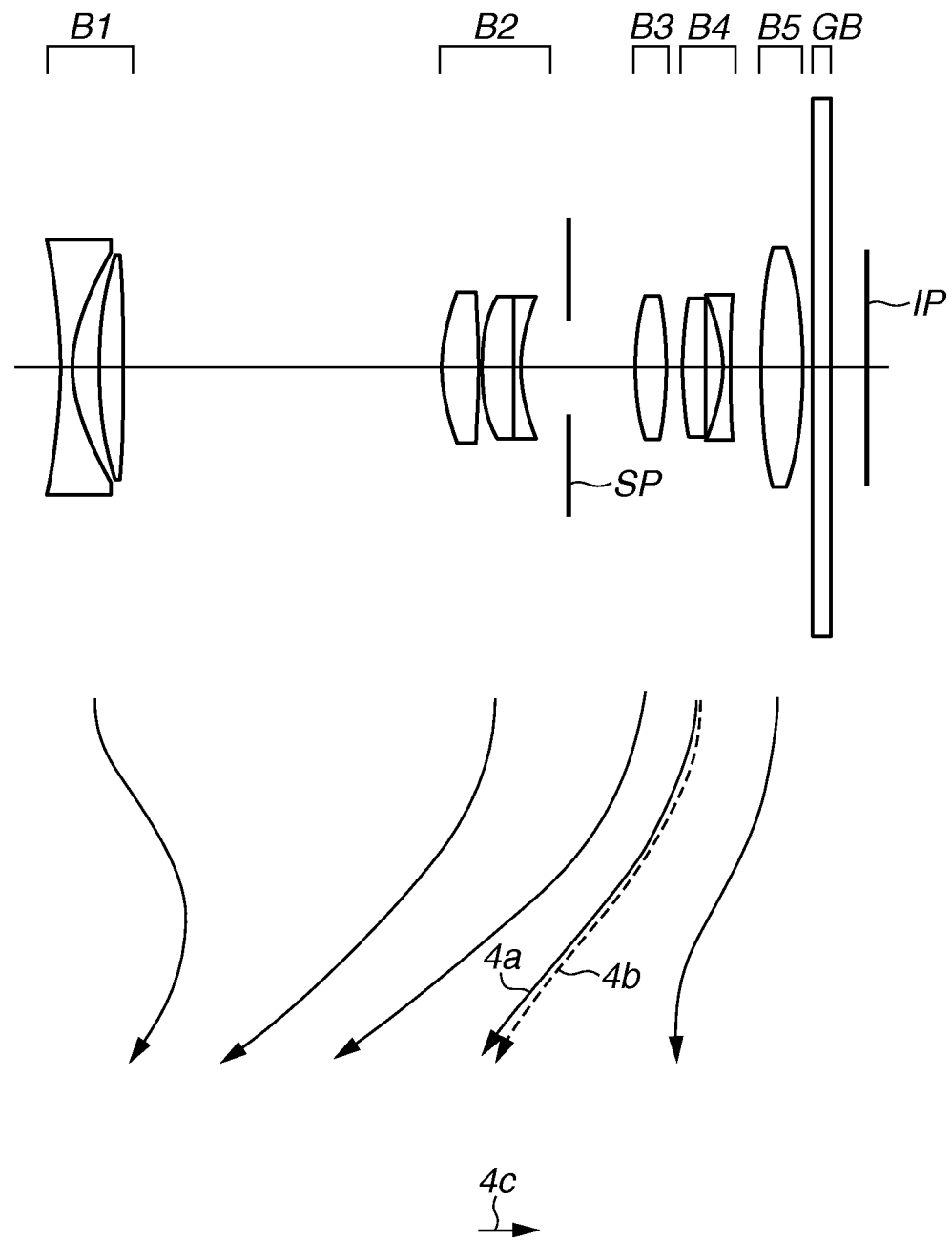
FIG. 11 is a lens cross-sectional view of a zoom lens according to a sixth exemplary embodiment of the present invention(s), at a wide-angle end.
Figure 12A:
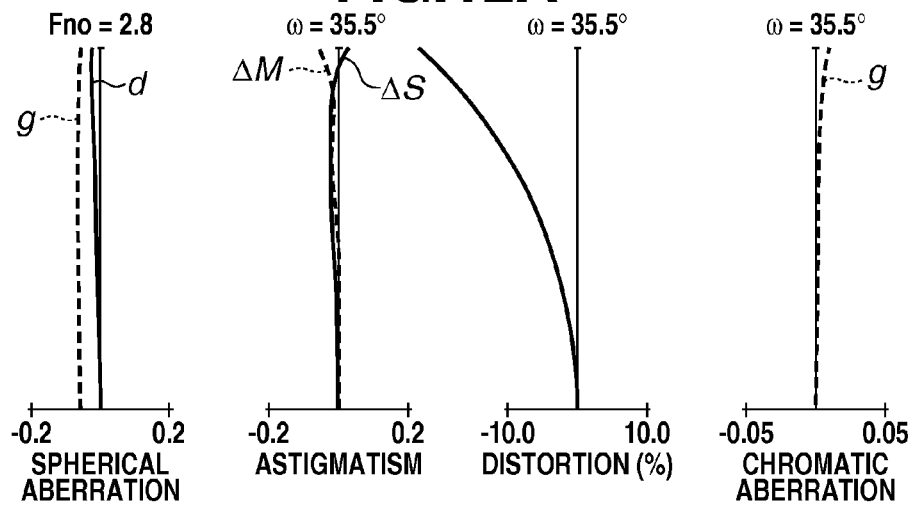
FIGS. 12A, 12B, and 12C are aberration diagrams of the zoom lens according to the sixth exemplary embodiment of the present invention(s), at the wide-angle end, a middle zoom position, and a telephoto end, respectively.
Figure 12B:
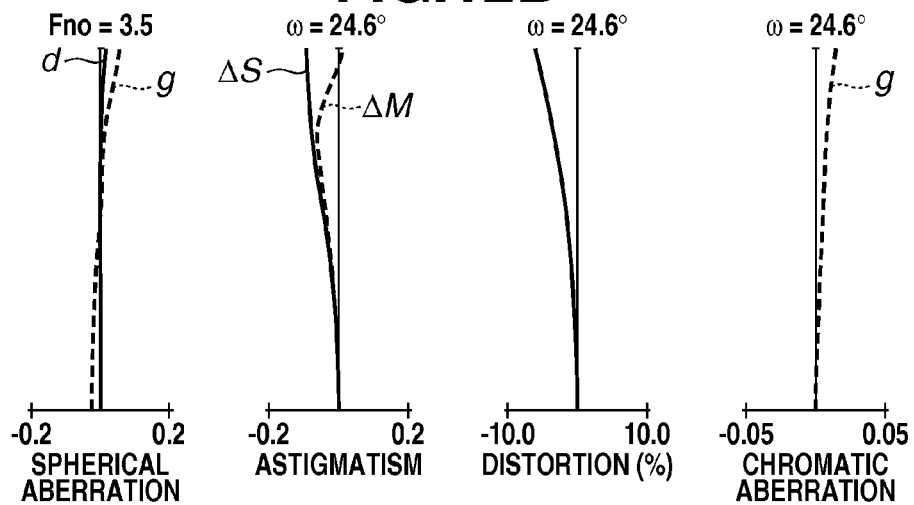
Figure 12C:
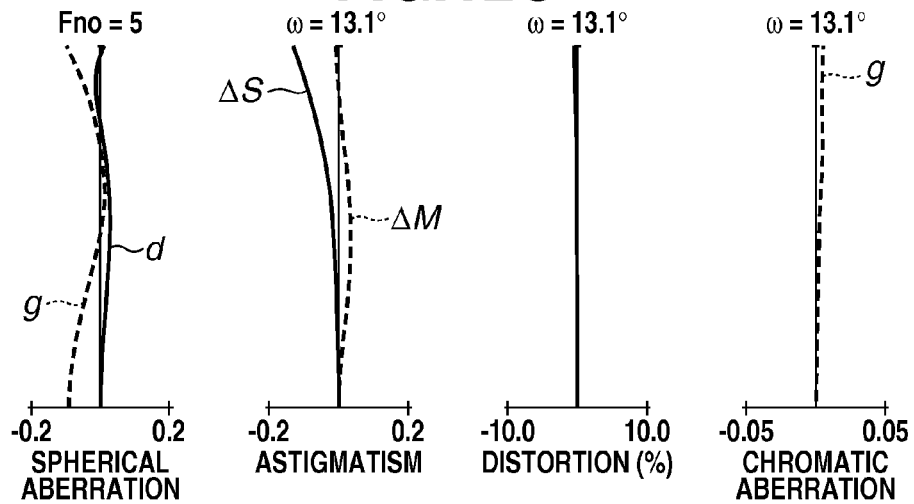

FIG. 9 is a lens cross-sectional view of a zoom lens according to a fifth exemplary embodiment, at a wide-angle end. FIGS. 10A, 10B, and 10C are aberration diagrams of the zoom lens according to the fifth exemplary embodiment, at the wide-angle end, a middle zoom position, and a telephoto end, respectively. The zoom lens according to the fifth exemplary embodiment has a zoom ratio of approximately 3.77 and an aperture ratio of approximately 2.80 to 5.00. FIG. 11 is a lens cross-sectional view of a zoom lens according to a sixth exemplary embodiment, at a wide-angle end. FIGS. 12A, 12B, and 12C are aberration diagrams of the zoom lens in the sixth exemplary embodiment, at the wide-angle end, a middle zoom position, and a telephoto end, respectively. The zoom lens according to the sixth exemplary embodiment has a zoom ratio of approximately 3.76 and an aperture ratio of approximately 2.80 to 5.00.

Figure 13:
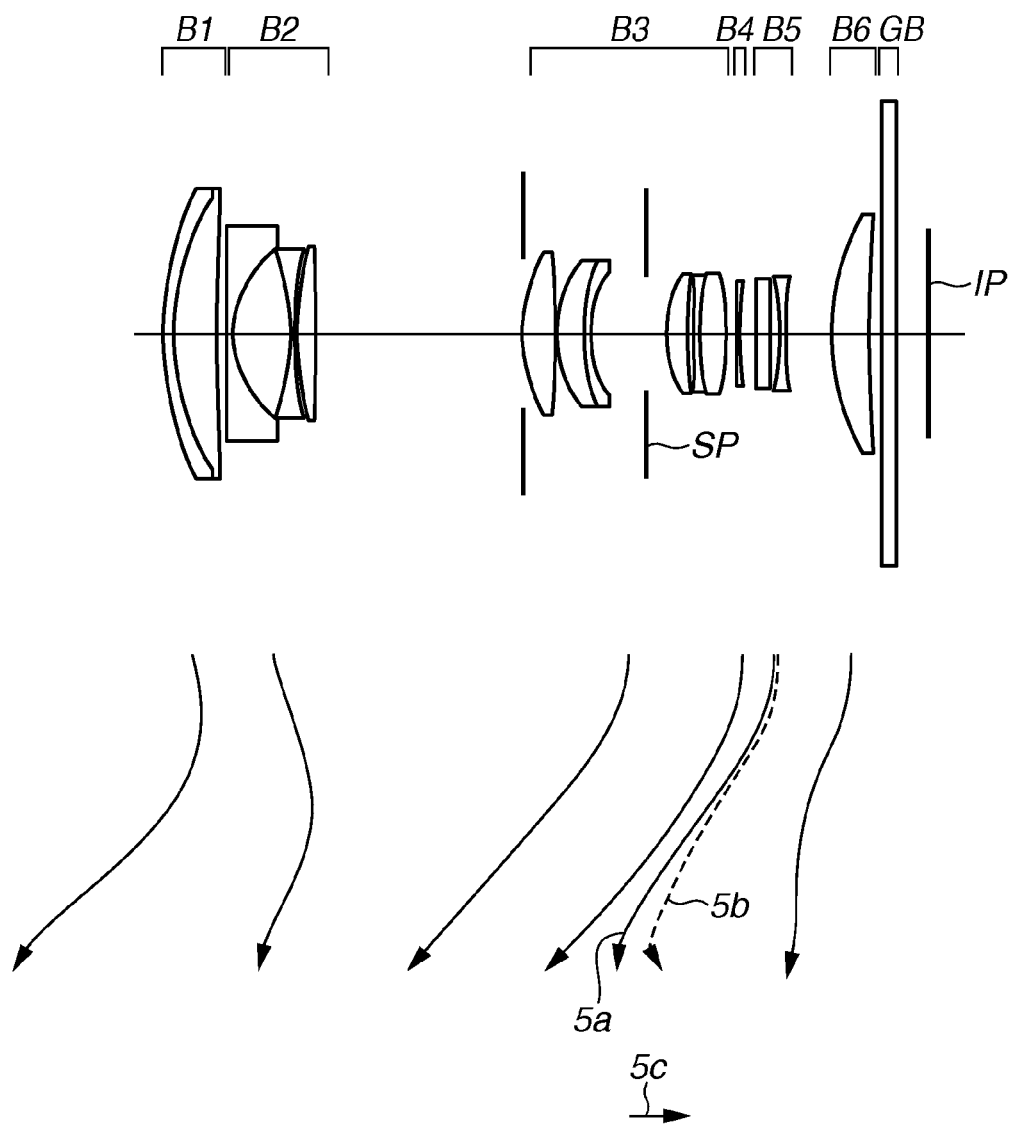
FIG. 13 is a lens cross-sectional view of a zoom lens according to a seventh exemplary embodiment of the present invention(s), at a wide-angle end.
Figure 14A:
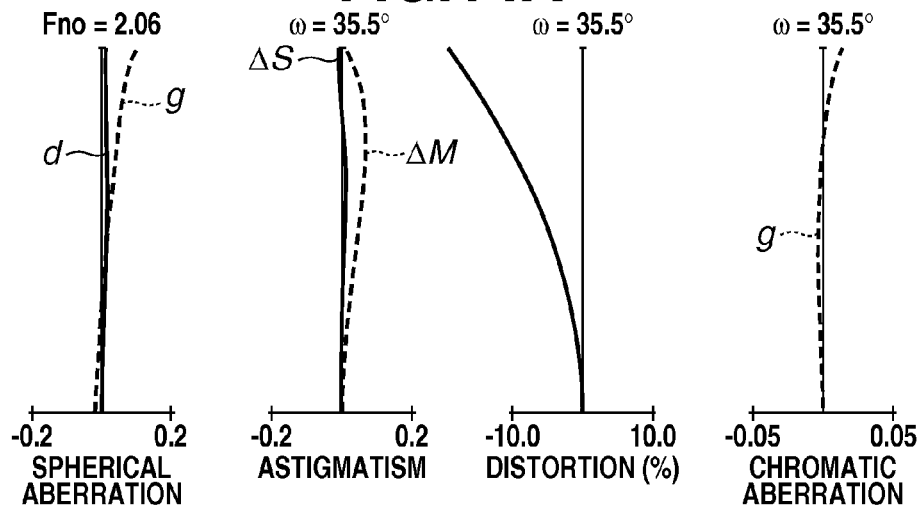
FIGS. 14A, 14B, and 14C are aberration diagrams of the zoom lens according to the seventh exemplary embodiment of the present invention(s), at the wide-angle end, a middle zoom position, and a telephoto end, respectively.
Figure 14B:
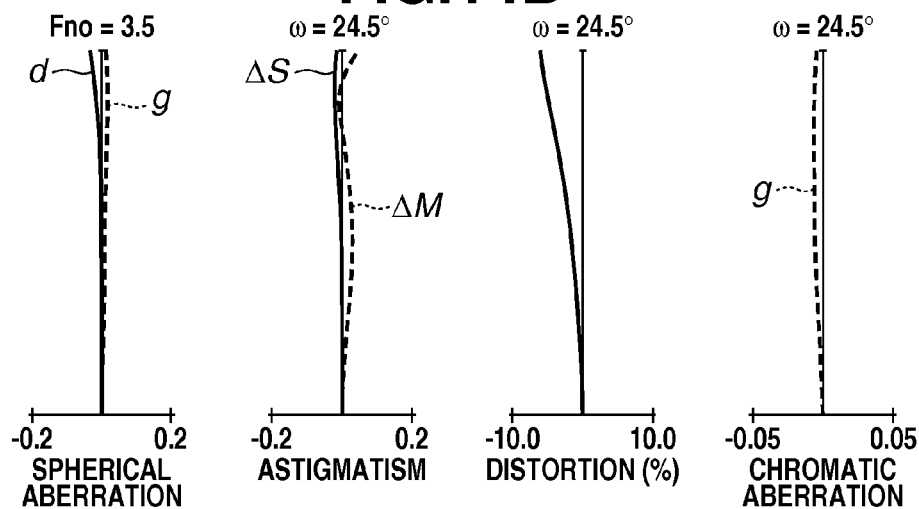
Figure 14C:
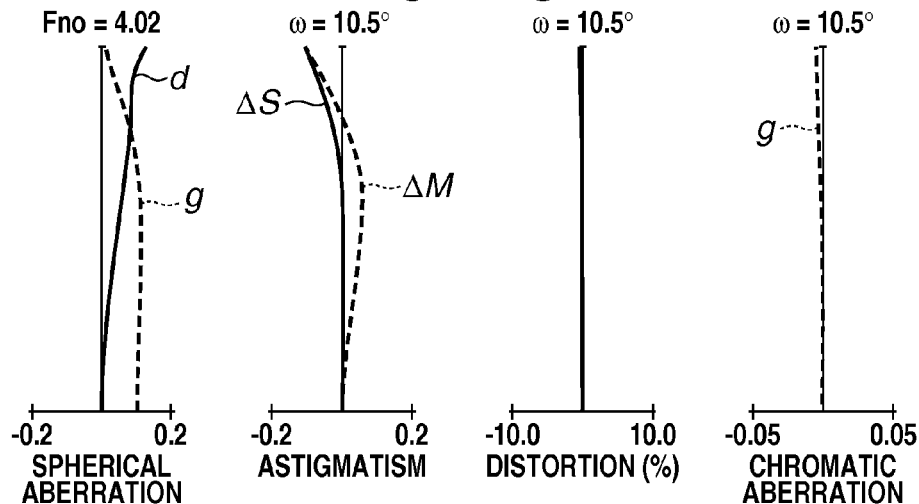
Figure 15:
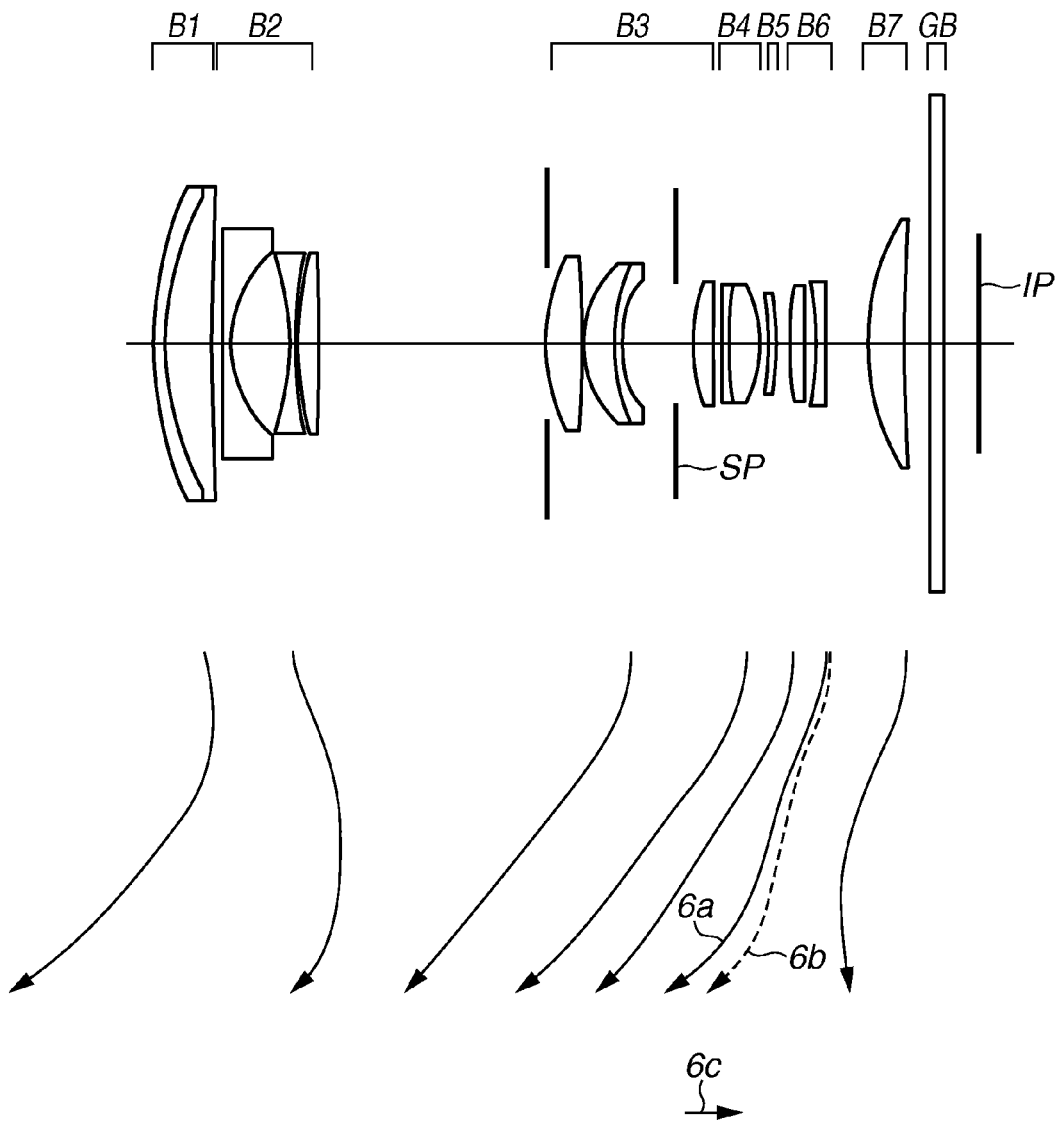
FIG. 15 is a lens cross-sectional view of a zoom lens according to an eighth exemplary embodiment of the present invention(s), at a wide-angle end.

FIG. 13 is a lens cross-sectional view of a zoom lens according to a seventh exemplary embodiment, at a wide-angle end. FIGS. 14A, 14B, and 14C are aberration diagrams of the zoom lens according to the seventh exemplary embodiment, at the wide-angle end, a middle zoom position, and a telephoto end, respectively. The zoom lens according to the seventh exemplary embodiment has a zoom ratio of approximately 4.73 and an aperture ratio of approximately 2.06 to 4.02. FIG. 15 is a lens cross-sectional view of a zoom lens according to an eighth exemplary embodiment, at a wide-angle end. FIGS. 16A, 16B, and 16C are aberration diagrams of the zoom lens according to the eighth exemplary embodiment, at the wide-angle end, a middle zoom position, and a telephoto end, respectively. The zoom lens according to the eighth exemplary embodiment has a zoom ratio of approximately 4.73 and an aperture ratio of approximately 2.06 to 4.00.

Figure 17:
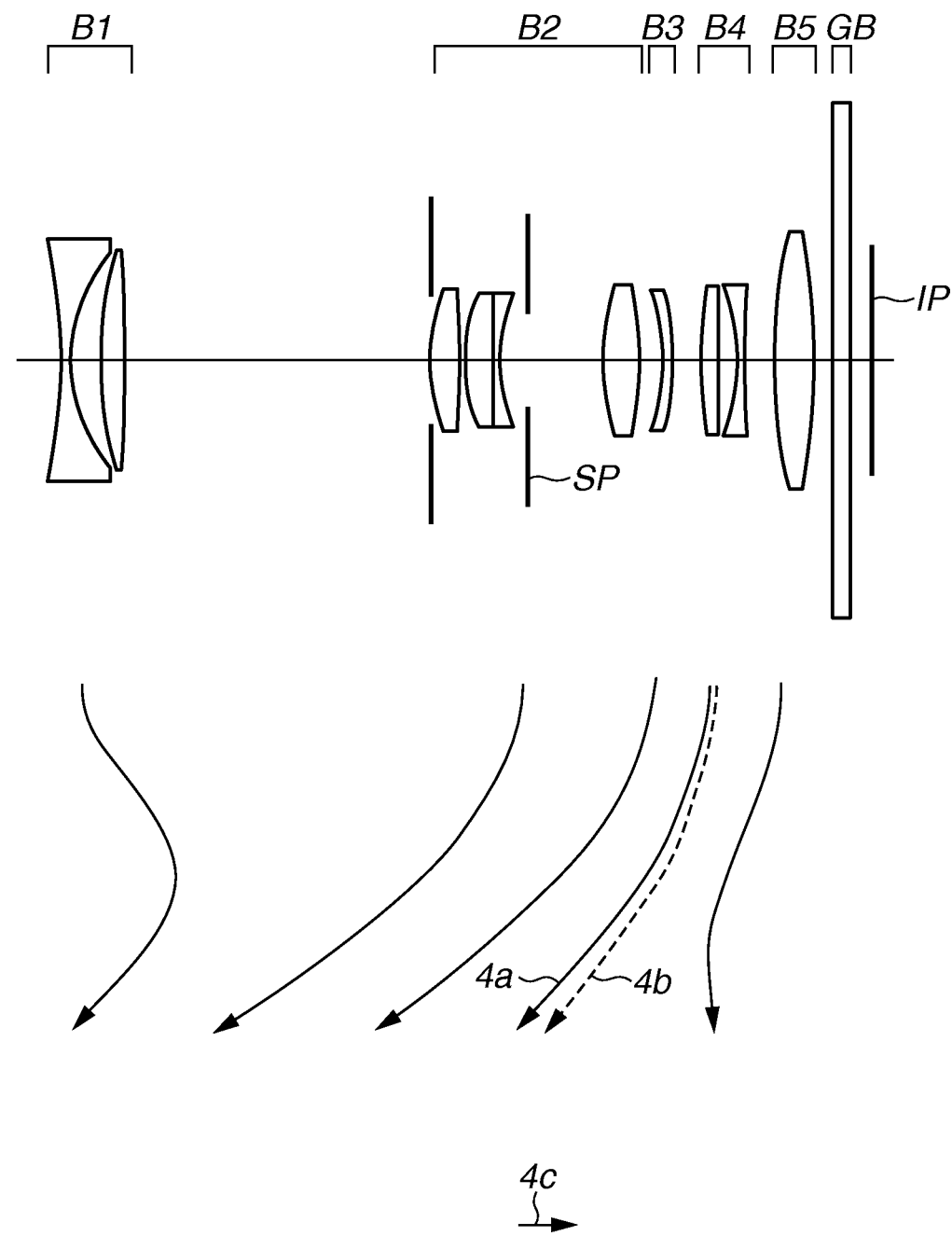
FIG. 17 is a lens cross-sectional view of a zoom lens according to a ninth exemplary embodiment of the present invention(s), at a wide-angle end.
Figure 19:
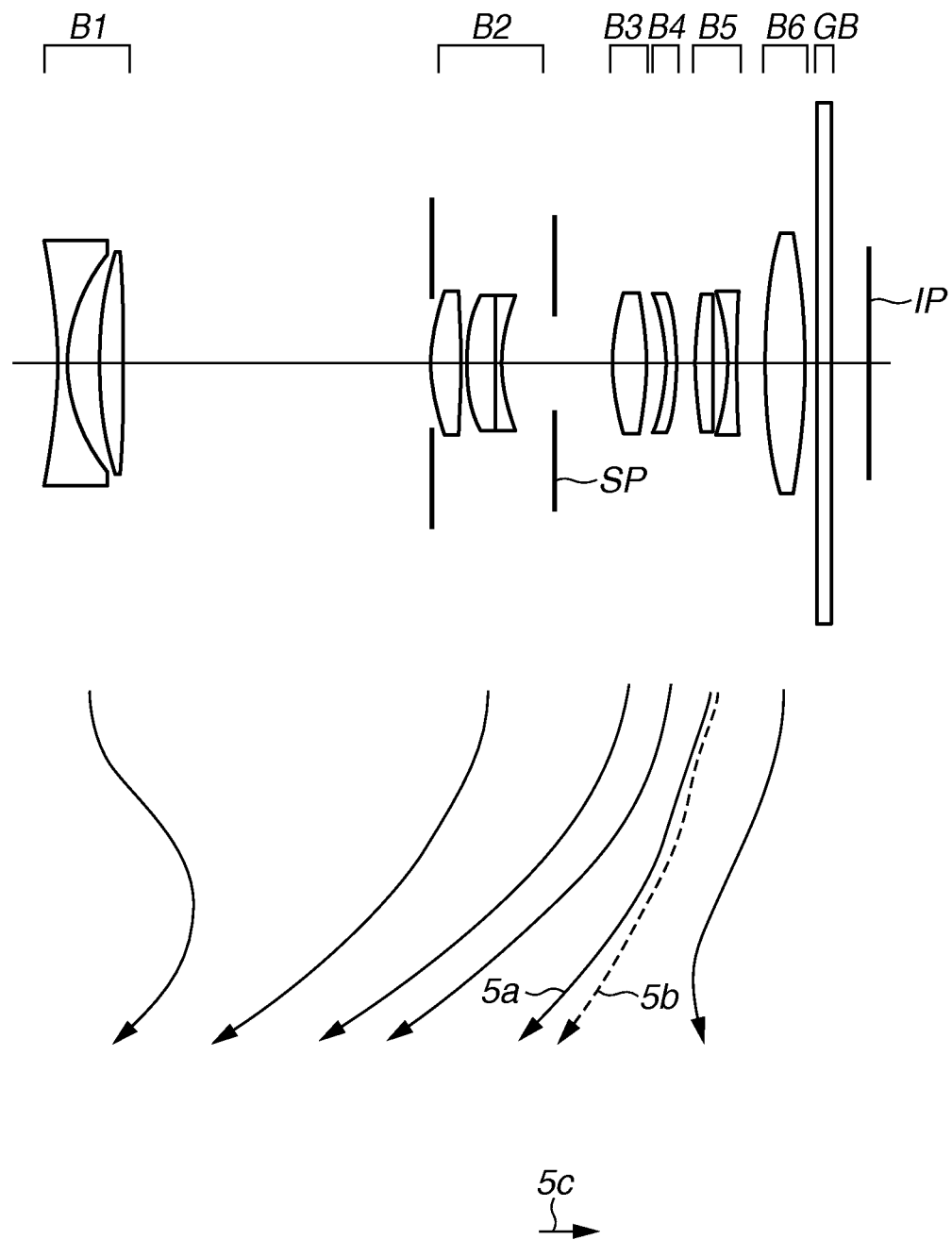
FIG. 19 is a lens cross-sectional view of a zoom lens according to a tenth exemplary embodiment of the present invention(s), at a wide-angle end.

FIG. 17 is a lens cross-sectional view of a zoom lens according to a ninth exemplary embodiment, at a wide-angle end. FIGS. 18A, 18B, and 18C are aberration diagrams of the zoom lens according to the ninth exemplary embodiment, at the wide-angle end, a middle zoom position, and a telephoto end, respectively. The zoom lens according to the ninth exemplary embodiment has a zoom ratio of approximately 3.76 and an aperture ratio of approximately 2.80 to 5.00. FIG. 19 is a lens cross-sectional view of a zoom lens according to a tenth exemplary embodiment, at a wide-angle end. FIGS. 20A, 20B, and 20C are aberration diagrams of the zoom lens according to the tenth exemplary embodiment, at the wide-angle end, a middle zoom position, and a telephoto end, respectively. The zoom lens according to the tenth exemplary embodiment has a zoom ratio of approximately 3.78 and an aperture ratio of approximately 2.80 to 5.00.

Figure 21:
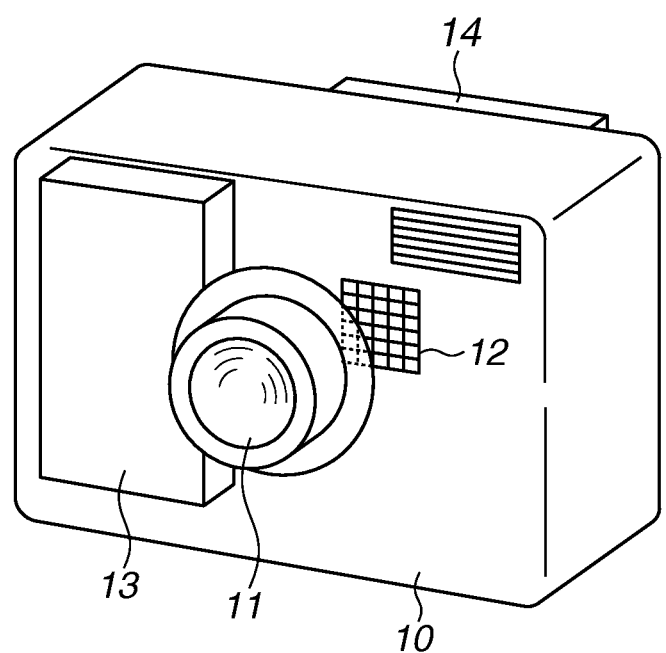
FIG. 21 is a schematic diagram of a main part of an imaging apparatus according to at least one exemplary embodiment of the present invention(s).

FIG. 21 is a schematic diagram of a main part of an imaging apparatus, such as a digital still camera, including a zoom lens according to at least one exemplary embodiment of the present invention(s). A zoom lens in each of the exemplary embodiments is an imaging lens system used in an imaging apparatus, such as, but not limited to, a video camera, a digital still camera, a silver-halide film camera, and a television camera. In the lens cross-sectional views, an object side (front) is illustrated on the left (e.g., of the views, of the zoom lens, to the left of the focus lens group, etc.), and an image side (rear) is illustrated on the right (e.g., of the views, of the zoom lens, to the right of the focus lens group, etc.). Also in the lens cross-sectional views, when "i" represents a lens group number counted from an object side to an image side, "Bi" represents an i-th lens group.

The zoom lens according to the first to third exemplary embodiments is a six-group zoom lens of positive-lead type, which includes (and/or, in one or more embodiments, consists of) six lens groups. The zoom lens includes, in order from the object side to the image side, a first lens group B1 having a positive refractive power, a second lens group B2 having a negative refractive power, a third lens group B3 having a positive refractive power, a fourth lens group B4 having a positive refractive power, a fifth lens group B5 having a negative refractive power, and a sixth lens group B6 having a positive refractive power. The zoom lens according to the fourth exemplary embodiment is a five-group zoom lens of positive-lead type, which includes (and/or, in one or more embodiments, consists of) five lens groups. The zoom lens includes, in order from the object side to the image side, a first lens group B1 having a positive refractive power, a second lens group B2 having a negative refractive power, a third lens group B3 having a positive refractive power, a fourth lens group B4 having a negative refractive power, and a fifth lens group B5 having a positive refractive power.

The zoom lens according to the fifth exemplary embodiment is a four-group zoom lens of negative-lead type, which includes (and/or, in one or more embodiments, consists of) four lens groups. The zoom lens includes, in order from the object side to the image side, a first lens group B1 having a negative refractive power, a second lens group B2 having a positive refractive power, a third lens group B3 having a negative refractive power, and a fourth lens group B4 having a positive refractive power. The zoom lens in the sixth exemplary embodiment is a five-group zoom lens of negative-lead type, which includes (and/or, in one or more embodiments, consists of) five lens groups. The zoom lens includes, in order from the object side to the image side, a first lens group B1 having a negative refractive power, a second lens group B2 having a positive refractive power, a third lens group B3 having a positive refractive power, a fourth lens group B4 having a negative refractive power, and a fifth lens group B5 having a positive refractive power.

The zoom lens according to the seventh exemplary embodiment is a six-group zoom lens of positive-lead type, which includes (and/or, in one or more embodiments, consists of) six lens groups. The zoom lens includes, in order from the object side to the image side, a first lens group B1 having a positive refractive power, a second lens group B2 having a negative refractive power, a third lens group B3 having a positive refractive power, a fourth lens group B4 having a negative refractive power, a fifth lens group B5 having a negative refractive power, and a sixth lens group B6 having a positive refractive power. The zoom lens according to the eighth exemplary embodiment is a seven-group zoom lens of positive-lead type, which includes (and/or, in one or more embodiments, consists of) seven lens groups. The zoom lens includes, in order from the object side to the image side, a first lens group B1 having a positive refractive power, a second lens group B2 having a negative refractive power, a third lens group B3 having a positive refractive power, a fourth lens group B4 having a positive refractive power, a fifth lens group B5 having a negative refractive power, a sixth lens group B6 having a negative refractive power, and a seventh lens group B7 having a positive refractive power.

The zoom lens according to the ninth exemplary embodiment is a five-group zoom lens of negative-lead type, which includes (and/or, in one or more embodiments, consists of) five lens groups. The zoom lens includes, in order from the object side to the image side, a first lens group B1 having a negative refractive power, a second lens group B2 having a positive refractive power, a third lens group B3 having a negative refractive power, a fourth lens group B4 having a negative refractive power, and a fifth lens group B5 having a positive refractive power. The zoom lens according to the tenth exemplary embodiment is a six-group zoom lens of negative-lead type, which includes (and/or, in one or more embodiments, consists of) six lens groups. The zoom lens includes, in order from the object side to the image side, a first lens group B1 having a negative refractive power, a second lens group B2 having a positive refractive power, a third lens group B3 having a positive refractive power, a fourth lens group B4 having a negative refractive power, a fifth lens group B5 having a negative refractive power, and a sixth lens group B6 having a positive refractive power.

In each of the exemplary embodiments, an aperture stop SP is arranged on an object side relative to the focus lens group. This enables the zoom lens to have a larger lens aperture, without increasing an effective diameter of a front lens.

An optical block GB corresponds to, or may include one or more of, an optical filter, a face plate, a low-pass filter, an infrared cut filter, and the like. When the zoom lens is used as an imaging optical system in a video camera and a digital camera, an image plane IP corresponds to a solid-state image sensor (a photoelectric conversion element) such as, but not limited to, a charge-coupled device sensor (CCD sensor) and/or a complementary metal-oxide semiconductor sensor (CMOS sensor). When the zoom lens is used as an imaging optical system in a silver-halide film camera, the image plane IP corresponds to a film surface.

In the aberration diagrams, a spherical aberration diagram illustrates a spherical aberration with respect to a d-line (wavelength 587.6 nm) and a g-line (wavelength 435.8 nm). In the spherical aberration diagram, Fno denotes an F-number. In an astigmatism diagram, ΔS and ΔM denote a sagittal image plane and a meridional image plane, respectively. A distortion diagram illustrates a distortion with reference to the d-line. A lateral chromatic aberration diagram illustrates a lateral chromatic aberration of the g-line. Symbol ω denotes a half viewing angle of imaging.

Further, in each of the exemplary embodiments, the lens groups move during zooming from a wide-angle end to a telephoto end. Arrows in each of the lens cross-sectional views each indicate a moving locus of each of their respective lens groups, as the result of zooming from a wide-angle end to a telephoto end.

The zoom lens according to each of the first to fourth, seventh, and eighth exemplary embodiments is a positive-lead type zoom lens, in which the first lens group B1 has a positive refractive power. A moving locus of the zoom lens according to each of the first to fourth, seventh, and eighth exemplary embodiments will be described below.

Specifically, in the zoom lens according to each of the first to fourth, seventh, and eighth exemplary embodiments, the first lens group B1 and the second lens group B2 move along a locus projecting toward the image side, during zooming from a wide-angle end to a telephoto end. The third to sixth lens groups B3 to B6 each move toward the object side. Further, in the zoom lens of the eighth exemplary embodiment, the seventh lens group B7 moves toward the object side.

Next, a moving locus of each of the lens groups in the zoom lens according to each of the fifth, sixth, ninth, and tenth exemplary embodiments will be described below. The zoom lens in each of the fifth, sixth, ninth, and tenth exemplary embodiments is a negative-lead type zoom lens, in which the first lens group B1 has a negative refractive power.

Specifically, in the zoom lens according to each of the fifth, sixth, ninth, and tenth exemplary embodiments, the first lens group B1 moves along a locus projecting toward the image side, during zooming from a wide-angle end to a telephoto end. The second to fourth lens groups B2 to B4 each move toward the object side. Further, in the zoom lens according to each of the sixth and ninth exemplary embodiments, the fifth lens group B5 moves toward the object side. Further, in the zoom lens according to the tenth exemplary embodiment, the fifth and sixth lens groups B5 and B6 move toward the object side.

In the zoom lens according to each of the first to third, seventh, and tenth exemplary embodiments, the fifth lens group B5 is a focus lens group. When shifting a focus from an infinite-distance object to a near-distance object at a telephoto end, the fifth lens group B5 moves to an image side as indicated by an arrow 5c in the lens cross-sectional view. In the lens cross-sectional view, a solid line 5a and a dotted line 5b indicate, in focusing on an infinite-distance object and a near-distance object, respectively, a moving locus of the fifth lens group B5 moving to correct an image plane variation caused by zooming from a wide-angle end to a telephoto end.

In the zoom lens according to each of the fourth, sixth, and ninth exemplary embodiments, the fourth lens group B4 is a focus lens group. When shifting a focus from an infinite-distance object to a near-distance object at a telephoto end, the fourth lens group B4 moves to an image side as indicated by an arrow 4c in the lens cross-sectional view. In the lens cross-sectional view, a solid line 4a and a dotted line 4b indicate, in focusing on an infinite-distance object and a near-distance object, respectively, a moving locus of the fourth lens group B4 moving to correct an image plane variation caused by zooming from a wide-angle end to a telephoto end.

In the zoom lens according to the fifth exemplary embodiment, the third lens group B3 is a focus lens group. When shifting a focus from an infinite-distance object to a near-distance object at a telephoto end, the third lens group B3 moves to an image side as indicated by an arrow 3c in the lens cross-sectional view. In the lens cross-sectional view, a solid line 3a and a dotted line 3b indicate, in focusing on an infinite-distance object and a near-distance object, respectively, a moving locus of the third lens group B3 moving to correct an image plane variation caused by zooming from a wide-angle end to a telephoto end.

In the zoom lens of the eighth exemplary embodiment, the sixth lens group B6 is a focus lens group. When shifting a focus from an infinite-distance object to a near-distance object at a telephoto end, the sixth lens group B6 moves to an image side as indicated by an arrow 6c in the lens cross-sectional view. In the lens cross-sectional view, a solid line 6a and a dotted line 6b indicate, in focusing on an infinite-distance object and a near-distance object, respectively, a moving locus of the sixth lens group B6 moving to correct an image plane variation caused by zooming from a wide-angle end to a telephoto end.

In each of the exemplary embodiments, when shifting a focus from an infinite-distance object to a near-distance object, an amount of movement of a focus lens group is reduced by moving a lens group having a relatively strong refractive power in order to adjust the focus. As a result, a total lens length can be shortened.

In a zoom lens of each of the exemplary embodiments, by allowing the occurrence of a distortion, a spherical aberration is excellently corrected, while the number of lenses arranged on an object side relative to an aperture stop SP is decreased. As a result, a front lens diameter can be reduced. On the other hand, when the occurrence of a distortion is allowed too much, it is difficult to sufficiently correct a variation of curvature of field in focusing. In each of the exemplary embodiments, the zoom lens is adjusted so that a variation of astigmatism and a variation of spherical aberration appear in the same direction in focusing. As a result, an in-focus position in the center of an image and an in-focus position in the periphery of the image come close to each other, and curvature of field is excellently corrected. For example, the zoom lens is configured in such a manner that astigmatism occurs in an "under" direction when a spherical aberration occurs in an "under" direction. On the other hand, the zoom lens is configured in such a manner that astigmatism occurs in an "over" direction when a spherical aberration occurs in an "over" direction. In each of the exemplary embodiments, an absolute value of a curvature radius of an object-side surface of a negative lens included in a focus lens group is smaller than an absolute value of a curvature radius of an image-side surface of a positive lens included in the focus lens group. This makes it possible to set a focus sensitivity appropriately. As a result, a zoom lens can be obtained, which has a compact size, a high resolution, and high optical performance over the entire zoom range, being adjusted so that a variation of astigmatism and a variation of spherical aberration appear in the same direction.

Moreover, in each of the exemplary embodiments, while not required, it is more desirable to satisfy at least one of the conditions below. In the conditions, a curvature radius of an image-side surface of a positive lens included in a focus lens group is denoted by RF, and a curvature radius of an object-side surface of a negative lens included in a focus lens group is denoted by RR. Also, a distance along an optical axis, at a telephoto end, between a focus lens group and an adjacent positive lens group arranged on the image side of the focus lens group is denoted by Drt. A distance along an optical axis, at a telephoto end, between a focus lens group and an adjacent lens group arranged on the object side of the focus lens group is denoted by Dft. A distance along an optical axis, at a wide-angle end, between a focus lens group and an adjacent positive lens group arranged on the image side of the focus lens group is denoted by Drw. A distance along an optical axis, at a wide-angle end, between a focus lens group and an adjacent lens group arranged on the object side of the focus lens group is denoted by Dfw. A curvature radius of the most-image-side lens surface in a lens group arranged adjacent to a focus lens group on the object side thereof is denoted by Ra, and a curvature radius of the most-object-side lens surface in a focus lens group is denoted by Rb. Here, a distance along an optical axis between two lens groups means a distance along an optical axis between the most-image-side lens surface in the object-side lens group among the two lens groups and the most-object-side lens surface in the image-side lens group among the two lens groups.

A curvature radius of the most-image-side lens surface in a focus lens group is denoted by Rc, and a curvature radius of the most-object-side lens surface in a positive lens group arranged adjacent to a focus lens group on the image side thereof is denoted by Rd. A focal length of a positive lens included in a focus lens group is denoted by fnp, and a focal length of a negative lens included in a focus lens group is denoted by fnn. A focal length of an air lens formed between an image-side surface of a positive lens included in a focus lens group and an object-side surface of a negative lens included in the focus lens group is denoted by fair. Further, a focal length of a focus lens group is arranged by fn, and a focal length of a positive lens group arranged adjacent to a focus lens group on the image side thereof is denoted by fp. Here are the conditions, desirably at least one of which is satisfied in one or more embodiments.

$$0.50 < (RF-RR)/(RF+RR) < 200.00 \quad (1)$$

$$0.00 < (Drt-Dft)/(Drw-Dfw) < 85.00 \quad (2)$$

$$-50.0 < (Ra-Rb)/(Ra+Rb) < 120.0 \quad (3)$$

$$-0.30 < (Rc-Rd)/(Rc+Rd) < 2.50 \quad (4)$$

$$-21.0 < fnp/fnn < -2.5 \quad (5)$$

$$0.10 < Dft/Drt < 1.80 \quad (6)$$

$$0.10 < Dfw/Drw < 2.60 \quad (7)$$

$$0.30 < fair/fn < 2.30 \quad (8)$$

$$-4.20 < fp/fn < -0.50 \quad (9)$$

It is undesirable that a value of Condition (1) is above its upper limit. When the value is above the upper limit, it is difficult for the zoom lens, in the entire zoom range, to be adjusted so that a variation of astigmatism and a variation of spherical aberration appear in the same direction. As a result, it is difficult to correct curvature of field satisfactorily.

It is undesirable that a value of Condition (1) is below its lower limit. When the value is below the lower limit, a variation amount of a spherical aberration caused by focusing at the time of close-up photography is increased, in the entire zoom range. As a result, it is difficult to sufficiently correct a spherical aberration generated during close-up imaging.

It is undesirable that a value of Condition (2) is above its upper limit. When the value is above the upper limit, an amount of movement of a focus lens group to an object side is increased, at a telephoto end. As a result, a total lens length is increased, at a telephoto end. It is undesirable that a value of Condition (2) is below its lower limit. When the value is below the lower limit, an amount of movement of a focus lens group to an image side is increased, at a telephoto end. As a result, a movable range of the focus lens group is restricted at the time of close-up photography, especially at a telephoto end.

It is undesirable that a value of Condition (3) is above its upper limit. When the value is above the upper limit, a refractive power of an air lens formed between a focus lens group and an adjacent lens group arranged on the object side of the focus lens group is excessively decreased. As a result, it is difficult to sufficiently correct curvature of field and astigmatism, in the entire zoom range. It is undesirable that a value of Condition (3) is below its lower limit. When the value is below the lower limit, a refractive power of an air lens formed between a focus lens group and an adjacent lens group arranged on the object side of the focus lens group is excessively increased. As a result, it is difficult to sufficiently correct curvature of field generated at a telephoto end.

It is undesirable that a value of Condition (4) is above its upper limit. When the value is above the upper limit, a refractive power of an air lens formed between a focus lens group and an adjacent positive lens group arranged on the image side of the focus lens group is excessively decreased. As a result, it is difficult to sufficiently correct curvature of field generated at a wide-angle end. It is undesirable that a value of Condition (4) is below its lower limit. When the value is below the lower limit, a refractive power of an air lens formed between a focus lens group and an adjacent positive lens group arranged on the image side of the focus lens group is excessively increased. As a result, it is difficult to sufficiently correct coma and a lateral chromatic aberration generated at a telephoto end.

It is undesirable that a value of Condition (5) is above its upper limit. When the value is above the upper limit, a refractive power of a positive lens included in a focus lens group is increased. As a result, it is difficult to sufficiently correct curvature of field, in the entire zoom range. It is undesirable that a value of Condition (5) is below its lower limit. When the value is below the lower limit, a refractive power of a negative lens included in a focus lens group is increased. As a result, it is difficult to sufficiently correct coma and a lateral chromatic aberration, in the entire zoom range.

It is undesirable that a value of Condition (6) is above its upper limit. When the value is above the upper limit, a distance along an optical axis, at a telephoto end, between a focus lens group and an adjacent positive lens group arranged on the image side of the focus lens group is shortened. As a result, it is difficult to sufficiently correct coma and a lateral chromatic aberration generated at a telephoto end. It is undesirable that a value of Condition (6) is below its lower limit. When the value is below the lower limit, a distance along an optical axis, at a telephoto end, between a focus lens group and an adjacent positive lens group arranged on the image side of the focus lens group is increased. As a result, a total lens length is increased at a telephoto end.

It is undesirable that a value of Condition (7) is above its upper limit. When the value is above the upper limit, a distance along an optical axis, at a wide-angle end, between a focus lens group and an adjacent lens group arranged on the object side of the focus lens group is increased. As a result, it is difficult to sufficiently correct curvature of field generated at a wide-angle end. It is undesirable that a value of Condition (7) is below its lower limit. When the value is below the lower limit, a distance along an optical axis, at a wide-angle end, between a focus lens group and an adjacent positive lens group arranged on the image side of the focus lens group is increased. As a result, it is difficult to sufficiently correct coma generated at a wide-angle end.

It is undesirable that a value of Condition (8) is above its upper limit. When the value is above the upper limit, a refractive power of an air lens formed between an image-side surface of a positive lens included in a focus lens group and an object-side surface of a negative lens included in the focus lens group is decreased. As a result, a variation amount of a spherical aberration is increased, in the entire zoom range. It is undesirable that a value of Condition (8) is below its lower limit. When the value is below the lower limit, a refractive power of an air lens formed between an image-side surface of a positive lens included in a focus lens group and an object-side surface of a negative lens included in the focus lens group is increased. As a result, it is difficult to sufficiently correct a spherical aberration and a lateral chromatic aberration generated at a wide-angle end.

It is undesirable that a value of Condition (9) is above its upper limit. When the value is above the upper limit, a negative refractive power of a focus lens group is decreased. As a result, an amount of movement of a focus lens group in focusing is increased, in the entire zoom range, which leads to an increased total lens length. It is undesirable that a value of Condition (9) is below its lower limit. When the value is below the lower limit, a negative refractive power of a focus lens group is increased. As a result, it is difficult to sufficiently correct coma and a lateral chromatic aberration generated at a wide-angle end.

Additionally, it is desirable to set numerical ranges of Conditions (1) to (9) in one or more embodiments as follows, so that maximum effect can be obtained with each Condition.

$$0.65 < (RF-RR)/(RF+RR) < 150.00 \quad (1a)$$

$$0.30 < (Drt-Dft)/(Drw-Dfw) < 60.00 \quad (2a)$$

$$-37.0 < (Ra-Rb)/(Ra+Rb) < 80.0 \quad (3a)$$

$$-0.24 < (Rc-Rd)/(Rc+Rd) < 1.90 \quad (4a)$$

$$-16.0 < fnp/fnn < -3.0 \quad (5a)$$

$$0.20 < Dft/Drt < 1.50 \quad (6a)$$

$$0.20 < Dfw/Drw < 2.00 \quad (7a)$$

$$0.50 < \text{fair}/fn < 1.50 \quad (8a)$$

$$-3.00 < fp/fn < -0.80 \quad (9a)$$

More desirably, numerical ranges of Conditions (1) to (9) are set, in one or more embodiments, as follows.

$$0.90 < (RF-RR)/(RF+RR) < 125.00 \quad (1b)$$

$$0.40 < (Drt-Dft)/(Drw-Dfw) < 50.00 \quad (2b)$$

$$-28.0 < (Ra-Rb)/(Ra+Rb) < 60.0 \quad (3b)$$

$$-0.20 < (Rc-Rd)/(Rc+Rd) < 1.50 \quad (4b)$$

$$-12.0 < fnp/fnn < -3.3 \quad (5b)$$

$$0.25 < Dft/Drt < 1.00 \quad (6b)$$

$$0.30 < Dfw/Drw < 1.50 \quad (7b)$$

$$0.60 < \text{fair}/fn < 1.20 \quad (8b)$$

$$-2.50 < fp/fn < -0.90 \quad (9b)$$

Next, a configuration of each lens group will be described below. The zoom lens in each of the first to fourth, seventh, and eighth exemplary embodiments is a positive-lead type zoom lens, in which the first lens group B1 has a positive refractive power. A lens configuration of the zoom lens in each of the first to fourth, seventh, and eighth exemplary embodiments is described below.

In each of the exemplary embodiments, the first lens group B1 includes (and/or, in one or more embodiments, consists of), in order from an object side to an image side, a negative lens, and a positive lens. With this configuration, a spherical aberration and a chromatic aberration, to which a zoom lens having a high zoom ratio is prone, are excellently corrected.

In each of the exemplary embodiments, the second lens group B2 includes (and/or, in one or more embodiments, consists of), in order from an object side to an image side, a negative lens, a negative lens, and a positive lens. With this configuration, an aberration variation caused by zooming is controlled, and especially a spherical aberration generated at a telephoto end is excellently corrected.

In each of the first to third, and eighth exemplary embodiments, the third lens group B3 includes (and/or, in one or more embodiments, consists of), in order from an object side to an image side, a positive lens, and a cemented lens formed by combining a positive lens and a negative lens. With this configuration, a principal point distance between the second lens group B2 and the third lens group B3 can be shortened. This enables reduction in thickness, on an optical axis, of a lens element arranged on an image side relative to the third lens group. In each of the fourth and seventh exemplary embodiments, the third lens group B3 includes (and/or, in one or more embodiments, consists of), in order from an object side to an image side, a positive lens, a cemented lens formed by combining a positive lens and a negative lens, a positive lens, a cemented lens formed by combining a negative lens and a positive lens. With this configuration, a principal point distance between the second lens group B2 and the third lens group B3 can be shortened. This enables reduction in thickness, on an optical axis, of a lens element arranged on the image side relative to the third lens group.

In each of the first to third, and eighth exemplary embodiments, the fourth lens group B4 includes (and/or, in one or more embodiments, consists of), in order from an object side to an image side, a positive lens, and a cemented lens formed by combining a negative lens and a positive lens. With this configuration, an aberration variation caused by zooming is excellently controlled. In the fourth exemplary embodiment, the fourth lens group B4 includes (and/or, in one or more embodiments, consists of), in order from an object side to an image side, a positive lens, and a negative lens. In the seventh exemplary embodiment, the fourth lens group B4 includes (and/or, in one or more embodiments, consists of) a negative lens.

In each of the first to third, and seventh exemplary embodiments, the fifth lens group B5 includes (and/or, in one or more embodiments, consists of), in order from an object side to an image side, a positive lens, and a negative lens. With this configuration, a variation of astigmatism and a variation of spherical aberration appear in the same direction in focusing, so that curvature of field is excellently corrected. In the fourth exemplary embodiment, the fifth lens group B5 includes (and/or, in one or more embodiments, consists of) a positive lens. In the eighth exemplary embodiment, the fifth lens group B5 includes (and/or, in one or more embodiments, consists of) a negative lens.

In each of the first to third, and seventh exemplary embodiments, the sixth lens group B6 includes (and/or, in one or more embodiments, consists of) a positive lens. In the eighth exemplary embodiment, the sixth lens group B6 includes (and/or, in one or more embodiments, consists of), in order from an object side to an image side, a positive lens, and a negative lens. With this configuration, a variation of astigmatism and a variation of spherical aberration appear in the same direction in focusing, so that curvature of field is excellently corrected. In the eighth exemplary embodiment, the seventh lens group B7 includes (and/or, in one or more embodiments, consists of) a positive lens.

Next, a lens configuration of the zoom lens in each of the fifth, sixth, ninth, and tenth exemplary embodiments is described below. The zoom lens in each of the fifth, sixth, ninth, and tenth exemplary embodiments is a negative-lead type zoom lens, in which the first lens group B1 has a negative refractive power.

In each of the exemplary embodiments, the first lens group B1 includes (and/or, in one or more embodiments, consists of), in order from an object side to an image side, a negative lens, and a positive lens. With this configuration, an aberration variation caused by zooming is controlled, and especially a spherical aberration generated at a telephoto end is excellently corrected.

In each of the fifth and ninth exemplary embodiments, the second lens group B2 includes (and/or, in one or more embodiments, consists of), in order from an object side to an image side, a positive lens, a cemented lens formed by combining a positive lens and a negative lens, and a positive lens. With this configuration, a principal point distance between the second lens group B2 and the third lens group B3 is shortened. This enables reduction in thickness, on an optical axis, of a lens element arranged on an image side relative to the third lens group. In each of the sixth and tenth exemplary embodiments, the second lens group B2 includes (and/or, in one or more embodiments, consists of), in order from an object side to an image side, a positive lens, and a cemented lens formed by combining a positive lens and a negative lens. With this configuration, a principal point distance between the second lens group B2 and the third lens group B3 is shortened. This enables reduction in thickness, on an optical axis, of a lens element arranged on an image side relative to the third lens group.

In the fifth exemplary embodiment, the third lens group B3 includes (and/or, in one or more embodiments, consists of), in order from an object side to an image side, a positive lens, and a negative lens. With this configuration, a variation of astigmatism and a variation of spherical aberration appear in the same direction in focusing, so that curvature of field is excellently corrected. In each of the sixth and tenth exemplary embodiments, the third lens group B3 includes (and/or, in one or more embodiments, consists of) a positive lens. In the ninth exemplary embodiment, the third lens group B3 includes (and/or, in one or more embodiments, consists of) a negative lens.

In the fifth exemplary embodiment, the fourth lens group B4 includes (and/or, in one or more embodiments, consists of) a positive lens. In each of the sixth and ninth exemplary embodiments, the fourth lens group B4 includes (and/or, in one or more embodiments, consists of) a negative lens, and a positive lens. In the tenth exemplary embodiment, the fourth lens group B4 includes (and/or, in one or more embodiments, consists of) a negative lens. With this configuration, a variation of astigmatism and a variation of spherical aberration appear in the same direction in focusing, so that curvature of field is excellently corrected.

In each of the sixth and ninth exemplary embodiments, the fifth lens group B5 includes (and/or, in one or more embodiments, consists of) a positive lens. In the tenth exemplary embodiment, the fifth lens group B5 includes (and/or, in one or more embodiments, consists of), in order from an object side to an image side, a positive lens, and a negative lens. With this configuration, a variation of astigmatism and a variation of spherical aberration appear in the same direction in focusing, so that curvature of field is excellently corrected. In the tenth exemplary embodiment, the sixth lens group B6 includes (and/or, in one or more embodiments, consists of) a positive lens.

Provided below are Numerical Examples 1 to 10, which correspond to the first to tenth exemplary embodiments of the present invention(s), respectively. In each of the Numerical Examples, when "i" represents the number of an optical surface counted from the object side, "ri" indicates a curvature radius of an i-th optical surface (an i-th surface), di indicates a distance between an i-th surface and an "i+1"-th surface, and "ndi" and "vdi" indicate a refractive index and an Abbe number, respectively, of a material of an i-th optical member with respect to a d-line.

A shape of an aspheric surface is represented by the following expression, where k denotes an eccentricity, A4, A6, and A8 denote aspheric coefficients, and h denotes a height from an optical axis. In the expression, x represents a displacement in an optical axis direction at the height h with reference to a surface vertex.

$$x = (h^2/R)/[1+[1-(1+k)(h/R)^2]^{1/2}] + A4h^4 + A6h^6 + A8h^8$$

Additionally, R denotes a paraxial curvature radius. In the Numerical Examples, "e-Z" means "$10^{-Z}$". Also in the Numerical Examples, two surfaces closest to an image plane correspond to surfaces of an optical block, such as, but not limited to, a filter and a face plate.

In each of the exemplary embodiments, a back focus (BF) is expressed in terms of a distance from the most-image-side lens surface to a paraxial image plane in a lens system, which has been converted into an air-equivalent length. In Tables 1-1 and 1-2, values of the foregoing conditions corresponding to each of the Numerical Examples are listed.

Meanwhile, an effective image circle diameter (an image circle diameter) at a wide-angle end can be smaller than an effective image circle diameter at a telephoto end, as it is possible to enlarge an image by image processing, to correct a barrel-shaped distortion which tends to occur in a wide-angle state.

Numerical Example 1

| Unit mm | | | | |
|---|---|---|---|---|
| Surface data | | | | |
| Surface number | r | d | nd | vd |
| 1 | 39.375 | 1.10 | 1.92286 | 18.9 |
| 2 | 30.570 | 4.75 | 1.77250 | 49.6 |
| 3 | 419.716 | (variable) | | |
| 4 | −3459.433 | 0.75 | 1.91082 | 35.3 |
| 5 | 12.751 | 5.83 | | |
| 6 | −29.264 | 0.62 | 1.71300 | 53.9 |
| 7 | 54.317 | 0.06 | | |
| 8 | 33.552 | 2.20 | 1.95906 | 17.5 |
| 9 | −284.127 | (variable) | | |
| 10 | ∞ | −0.10 | | |
| 11* | 18.415 | 3.40 | 1.76802 | 49.2 |
| 12* | −124.882 | 0.10 | | |
| 13 | 12.428 | 3.15 | 1.48749 | 70.2 |
| 14 | 22.451 | 0.55 | 2.00069 | 25.5 |
| 15 | 11.291 | 2.40 | | |
| 16 (stop) | ∞ | (variable) | | |
| 17* | 19.993 | 2.10 | 1.69350 | 53.2 |
| 18* | −507.520 | 0.97 | | |
| 19 | −25.423 | 0.65 | 1.80518 | 25.4 |
| 20 | −464.695 | 3.05 | 1.48749 | 70.2 |
| 21 | −14.615 | (variable) | | |
| 22 | 43.434 | 1.41 | 1.83400 | 37.2 |
| 23 | 157.511 | 1.80 | | |
| 24* | −20.545 | 0.70 | 1.85135 | 40.1 |
| 25* | 69.392 | (variable) | | |
| 26 | 28.388 | 3.50 | 1.91082 | 35.3 |
| 27 | 200.000 | (variable) | | |
| 28 | ∞ | 1.55 | 1.51633 | 64.1 |
| 29 | ∞ | 3.31 | | |
| Image plane | ∞ | | | |

Aspheric surface data

Eleventh surface

K = −4.30172e−001 A4 = −1.25456e−005 A6 = 1.00698e−008
Twelfth surface

K = 0.00000e+000 A4 = −1.76812e−007 A6 = 2.50782e−008
Seventeenth surface

K = 0.00000e+000 A4 = 1.62918e−005 A6 = 5.31542e−007
A8 = 8.39515e−009
Eighteenth surface K = 0.00000e+000 A4 = 5.86535e−005 A6 = 7.68295e−007
A8 = 1.04881e−008

-continued

Unit mm

Twenty-fourth surface

K = 0.00000e+000 A4 = 1.99192e−005 A6 = 1.43693e−006
A8 = −1.54184e−008
Twenty-fifth surface K = 0.00000e+000 A4 = 2.94121e−005 A6 = 9.29156e−007
A8 = −1.08271e−008

Various kinds of data
Zoom ratio 4.72

|  | Wide angle | Middle | Telephoto |
| --- | --- | --- | --- |
| Focal length | 12.84 | 22.91 | 60.63 |
| F-number | 2.06 | 3.50 | 4.02 |
| Half viewing angle | 35.53 | 24.55 | 10.51 |
| Image height | 9.17 | 10.46 | 11.25 |
| Total lens length | 81.50 | 83.48 | 100.14 |
| BF | 7.83 | 12.96 | 14.18 |
| d3 | 0.91 | 6.90 | 19.01 |
| d9 | 22.09 | 10.46 | 0.40 |
| d16 | 2.59 | 2.83 | 1.30 |
| d21 | 1.69 | 3.66 | 10.01 |
| d25 | 4.61 | 4.90 | 13.46 |
| d27 | 3.50 | 8.63 | 9.85 |

Zoom lens group data

| Lens group | Start surface | Focal length |
| --- | --- | --- |
| 1 | 1 | 59.31 |
| 2 | 4 | −12.78 |
| 3 | 11 | 26.95 |
| 4 | 17 | 26.60 |
| 5 | 22 | −26.53 |
| 6 | 26 | 35.97 |

Numerical Example 2

Unit mm

Surface data

| Surface number | r | d | nd | vd |
| --- | --- | --- | --- | --- |
| 1 | 40.487 | 1.10 | 1.92286 | 18.9 |
| 2 | 31.162 | 4.75 | 1.77250 | 49.6 |
| 3 | 605.034 | (variable) |  |  |
| 4 | −471.950 | 0.75 | 1.91082 | 35.3 |
| 5 | 12.977 | 5.65 |  |  |
| 6 | −29.035 | 0.62 | 1.71300 | 53.9 |
| 7 | 55.687 | 0.06 |  |  |
| 8 | 32.928 | 2.20 | 1.95906 | 17.5 |
| 9 | −323.996 | (variable) |  |  |
| 10 | ∞ | −0.10 |  |  |
| 11* | 17.819 | 3.40 | 1.76802 | 49.2 |
| 12* | −179.132 | 0.10 |  |  |
| 13 | 12.449 | 3.15 | 1.48749 | 70.2 |
| 14 | 23.216 | 0.55 | 2.00069 | 25.5 |
| 15 | 11.276 | 2.30 |  |  |
| 16 (stop) | ∞ | (variable) |  |  |
| 17* | 16.452 | 2.10 | 1.69350 | 53.2 |
| 18* | 76.944 | 1.15 |  |  |
| 19 | −96.180 | 0.65 | 1.80518 | 25.4 |
| 20 | 42.072 | 0.00 |  |  |
| 21 | 42.072 | 3.05 | 1.48749 | 70.2 |
| 22 | −21.340 | (variable) |  |  |
| 23 | 29.406 | 1.41 | 1.83400 | 37.2 |
| 24 | 37.777 | 1.51 |  |  |
| 25* | −36.295 | 0.70 | 1.85135 | 40.1 |
| 26* | 34.775 | (variable) |  |  |
| 27 | 26.904 | 3.50 | 1.91082 | 35.3 |
| 28 | 200.000 | (variable) |  |  |
| 29 | ∞ | 1.55 | 1.51633 | 64.1 |
| 30 | ∞ | 3.31 |  |  |
| Image plane | ∞ |  |  |  |

Aspheric surface data

Eleventh surface

K = −1.39476e−003 A4 = −1.91529e−005 A6 = 3.48565e−009
Twelfth surface

K = 0.00000e+000 A4 = 1.47762e−006 A6 = 4.30060e−008
Seventeenth surface

K = 0.00000e+000 A4 = 1.01044e−005 A6 = 5.60591e−007
A8 = 8.60394e−009
Eighteenth surface K = 0.00000e+000 A4 = 5.86535e−005 A6 = 7.68295e−007
A8 = 1.04881e−008
Twenty-fifth surface K = 0.00000e+000 A4 = −1.08123e−004 A6 = 3.83708e−006
A8 = −3.59207e−008
Twenty-sixth surface K = 0.00000e+000 A4 = −7.39157e−005 A6 = 3.22046e−006
A8 = −2.90647e−008

Various kinds of data
Zoom ratio 4.73

|  | Wide angle | Middle | Telephoto |
| --- | --- | --- | --- |
| Focal length | 12.84 | 22.90 | 60.72 |
| F-number | 2.06 | 3.50 | 4.02 |
| Half viewing angle | 35.53 | 24.55 | 10.50 |
| Image height | 9.17 | 10.46 | 11.25 |
| Total lens length | 81.50 | 83.31 | 100.81 |
| BF | 7.75 | 12.57 | 13.86 |
| d3 | 0.97 | 7.14 | 19.32 |
| d9 | 22.11 | 10.54 | 0.35 |
| d16 | 3.27 | 3.19 | 2.76 |
| d22 | 1.60 | 3.74 | 10.36 |
| d26 | 4.49 | 4.80 | 12.85 |
| d28 | 3.41 | 8.24 | 9.52 |

Zoom lens group data

| Lens group | Start surface | Focal length |
| --- | --- | --- |
| 1 | 1 | 59.41 |
| 2 | 4 | −12.77 |
| 3 | 11 | 27.73 |
| 4 | 17 | 25.73 |
| 5 | 23 | −25.14 |
| 6 | 27 | 33.80 |

Numerical Example 3

Unit mm

Surface data

| Surface number | r | d | nd | vd |
| --- | --- | --- | --- | --- |
| 1 | 40.577 | 1.10 | 1.92286 | 18.9 |
| 2 | 31.248 | 4.75 | 1.77250 | 49.6 |
| 3 | 642.126 | (variable) |  |  |
| 4 | −466.931 | 0.75 | 1.91082 | 35.3 |
| 5 | 12.960 | 5.63 |  |  |
| 6 | −28.665 | 0.62 | 1.71300 | 53.9 |

-continued

Unit mm

| | | | | |
|---|---|---|---|---|
| 7 | 54.991 | 0.06 | | |
| 8 | 32.809 | 2.20 | 1.95906 | 17.5 |
| 9 | −315.180 | (variable) | | |
| 10 | ∞ | −0.10 | | |
| 11* | 17.983 | 3.40 | 1.76802 | 49.2 |
| 12* | −164.423 | 0.10 | | |
| 13 | 12.292 | 3.15 | 1.48749 | 70.2 |
| 14 | 22.844 | 0.55 | 2.00069 | 25.5 |
| 15 | 11.175 | 2.33 | | |
| 16 (stop) | ∞ | (variable) | | |
| 17* | 16.604 | 2.10 | 1.69350 | 53.2 |
| 18* | 79.954 | 1.13 | | |
| 19 | −99.942 | 0.65 | 1.80518 | 25.4 |
| 20 | 40.772 | 3.05 | 1.48749 | 70.2 |
| 21 | −21.479 | (variable) | | |
| 22 | 29.450 | 1.41 | 1.83400 | 37.2 |
| 23 | 37.396 | 1.50 | | |
| 24* | −36.655 | 0.70 | 1.85135 | 40.1 |
| 25* | 33.862 | (variable) | | |
| 26 | 26.134 | 3.50 | 1.91082 | 35.3 |
| 27 | 200.000 | (variable) | | |
| 28 | ∞ | 1.55 | 1.51633 | 64.1 |
| 29 | ∞ | 3.31 | | |
| Image plane | ∞ | | | |

Aspheric surface data

Eleventh surface

K = 4.22874e−002 A4 = −1.99671e−005 A6 = 3.17356e−009
Twelfth surface

K = 0.00000e+000 A4 = 1.74329e−006 A6 = 4.44206e−008
Seventeenth surface

K = 0.00000e+000 A4 = 1.03942e−005 A6 = 5.74134e−007
A8 = 8.54783e−009
Eighteenth surface K = 0.00000e+000 A4 = 5.86535e−005 A6 = 7.68295e−007
A8 = 1.04881e−008
Twenty-fourth surface K = 0.00000e+000 A4 = −7.40108e−005 A6 = 3.06937e−006
A8 = −2.94235e−008
Twenty-fifth surface K = 0.00000e+000 A4 = −4.19278e−005 A6 = 2.51631e−006
A8 = −2.33088e−008

Various kinds of data
Zoom ratio 4.73

| | Wide angle | Middle | Telephoto |
|---|---|---|---|
| Focal length | 12.84 | 22.90 | 60.72 |
| F-number | 2.06 | 3.50 | 4.02 |
| Half viewing angle | 35.53 | 24.55 | 10.50 |
| Image height | 9.17 | 10.46 | 11.25 |
| Total lens length | 81.50 | 83.32 | 100.65 |
| BF | 7.91 | 12.59 | 13.47 |
| d3 | 0.96 | 7.12 | 19.30 |
| d9 | 21.97 | 10.44 | 0.36 |
| d16 | 3.29 | 3.16 | 2.60 |
| d21 | 1.60 | 3.94 | 11.00 |
| d25 | 4.44 | 4.74 | 12.59 |
| d27 | 3.57 | 8.25 | 9.13 |

Zoom lens group data

| Lens group | Start surface | Focal length |
|---|---|---|
| 1 | 1 | 59.30 |
| 2 | 4 | −12.68 |
| 3 | 11 | 27.60 |
| 4 | 17 | 25.81 |

-continued

Unit mm

| | | |
|---|---|---|
| 5 | 22 | −24.70 |
| 6 | 26 | 32.69 |

Numerical Example 4

Unit mm

Surface data

| Surface number | r | d | nd | vd |
|---|---|---|---|---|
| 1 | 42.320 | 1.10 | 1.92286 | 18.9 |
| 2 | 32.965 | 4.75 | 1.77250 | 49.6 |
| 3 | 1746.895 | (variable) | | |
| 4 | −309.821 | 0.75 | 1.91082 | 35.3 |
| 5 | 13.092 | 5.56 | | |
| 6 | −28.883 | 0.62 | 1.71300 | 53.9 |
| 7 | 54.247 | 0.06 | | |
| 8 | 32.726 | 2.20 | 1.95906 | 17.5 |
| 9 | −322.821 | (variable) | | |
| 10 | ∞ | −0.10 | | |
| 11* | 17.792 | 3.40 | 1.76802 | 49.2 |
| 12* | −181.228 | 0.10 | | |
| 13 | 12.431 | 3.15 | 1.48749 | 70.2 |
| 14 | 23.617 | 0.55 | 2.00069 | 25.5 |
| 15 | 11.339 | 2.49 | | |
| 16 (stop) | ∞ | 3.30 | | |
| 17* | 16.243 | 2.10 | 1.69350 | 53.2 |
| 18* | 71.949 | 1.17 | | |
| 19 | −94.182 | 0.65 | 1.80518 | 25.4 |
| 20 | 41.553 | 3.05 | 1.48749 | 70.2 |
| 21 | −23.795 | (variable) | | |
| 22 | 25.815 | 1.41 | 1.83400 | 37.2 |
| 23 | 37.394 | 1.45 | | |
| 24* | −36.654 | 0.70 | 1.85135 | 40.1 |
| 25* | 35.564 | (variable) | | |
| 26 | 27.719 | 3.50 | 1.91082 | 35.3 |
| 27 | 200.000 | (variable) | | |
| 28 | ∞ | 1.55 | 1.51633 | 64.1 |
| 29 | ∞ | 3.31 | | |
| Image plane | ∞ | | | |

Aspheric surface data

Eleventh surface

K = −2.54811e−002 A4 = −1.70118e−005 A6 = −2.62266e−009
Twelfth surface

K = 0.00000e+000 A4 = 3.41180e−006 A6 = 2.88670e−008
Seventeenth surface

K = 0.00000e+000 A4 = 1.48642e−005 A6 = 5.14772e−007
A8 = 9.39484e−009
Eighteenth surface K = 0.00000e+000 A4 = 5.86535e−005 A6 = 7.68295e−007
A8 = 1.04881e−008
Twenty-fourth surface K = 0.00000e+000 A4 = −2.51574e−005 A6 = 2.32352e−006
A8 = −2.44744e−008
Twenty-fifth surface K = 0.00000e+000 A4 = 4.08208e−006 A6 = 1.91808e−006
A8 = −1.97314e−008

-continued

Unit mm

Various kinds of data
Zoom ratio 4.73

| | Wide angle | Middle | Telephoto |
|---|---|---|---|
| Focal length | 12.84 | 22.91 | 60.73 |
| F-number | 2.06 | 3.50 | 4.02 |
| Half viewing angle | 35.53 | 24.55 | 10.50 |
| Image height | 9.17 | 10.46 | 11.25 |
| Total lens length | 81.50 | 84.36 | 104.44 |
| BF | 7.93 | 12.89 | 15.29 |
| d3 | 0.95 | 7.07 | 18.67 |
| d9 | 21.65 | 10.51 | 0.37 |
| d21 | 1.60 | 3.70 | 11.27 |
| d25 | 4.39 | 5.20 | 13.86 |
| d27 | 3.59 | 8.55 | 10.95 |

Zoom lens group data

| Lens group | Start surface | Focal length |
|---|---|---|
| 1 | 1 | 59.22 |
| 2 | 4 | −12.64 |
| 3 | 11 | 20.22 |
| 4 | 22 | −28.72 |
| 5 | 26 | 34.99 |

Numerical Example 5

Unit mm

Surface data

| Surface number | r | d | nd | vd |
|---|---|---|---|---|
| 1* | −50.467 | 1.00 | 1.85135 | 40.1 |
| 2* | 16.021 | 3.00 | | |
| 3* | 51.134 | 2.14 | 2.00178 | 19.3 |
| 4 | −350.000 | (variable) | | |
| 5 | ∞ | −0.10 | | |
| 6* | 20.562 | 2.95 | 1.76238 | 35.9 |
| 7* | −92.582 | 0.50 | | |
| 8 | 17.542 | 3.52 | 1.59141 | 61.0 |
| 9 | −224.839 | 0.50 | 1.87229 | 22.1 |
| 10 | 16.071 | 1.77 | | |
| 11 (stop) | ∞ | 8.50 | | |
| 12 | 27.679 | 3.36 | 1.59380 | 60.9 |
| 13* | −39.756 | (variable) | | |
| 14 | 38.187 | 2.00 | 1.54553 | 64.4 |
| 15 | ∞ | 2.16 | | |
| 16* | −13.723 | 0.70 | 1.85135 | 40.1 |
| 17* | 293.381 | (variable) | | |
| 18 | 68.682 | 4.00 | 1.83902 | 38.4 |
| 19 | −51.872 | (variable) | | |
| 20 | ∞ | 1.55 | 1.51633 | 64.1 |
| 21 | ∞ | 3.31 | | |
| Image plane | ∞ | | | |

Aspheric surface data

First surface

K = 0.00000e+000 A4 = 1.13733e−005 A6 = −6.65008e−008
A8 = 1.25579e−010
Second surface K = 0.00000e+000 A4 = −2.26305e−005 A6 = 2.41249e−008
A8 = −6.97200e−010
Third surface K = 0.00000e+000 A4 = 4.36681e−006 A6 = 8.25510e−008
A8 = −7.00216e−011

-continued

Unit mm

Sixth surface

K = −1.07279e+000 A4 = 5.86527e−006 A6 = −5.25221e−008
Seventh surface

K = 0.00000e+000 A4 = 8.68413e−006 A6 = −5.85609e−008
Thirteenth surface

K = 0.00000e+000 A6 = 6.81143e−008 A8 = 3.19707e−010
Sixteenth surface

K = 0.00000e+000 A4 = 3.33715e−005 A6 = 1.29365e−006
A8 = −1.38160e−008
Seventeenth surface K = 0.00000e+000 A4 = 3.33381e−005 A6 = 7.31822e−007
A8 = −1.02029e−008

Various kinds of data
Zoom ratio 3.77

| | Wide angle | Middle | Telephoto |
|---|---|---|---|
| Focal length | 12.88 | 23.10 | 48.60 |
| F-number | 2.80 | 3.50 | 5.00 |
| Half viewing angle | 35.45 | 24.37 | 13.03 |
| Image height | 9.17 | 10.46 | 11.25 |
| Total lens length | 77.57 | 69.53 | 76.70 |
| BF | 5.14 | 8.35 | 9.51 |
| d4 | 29.77 | 12.51 | 0.41 |
| d13 | 3.42 | 5.61 | 12.54 |
| d17 | 2.71 | 6.53 | 17.71 |
| d19 | 0.80 | 4.01 | 5.17 |

Zoom lens group data

| Lens group | Start surface | Focal length |
|---|---|---|
| 1 | 1 | −23.29 |
| 2 | 6 | 21.19 |
| 3 | 14 | −21.05 |
| 4 | 18 | 35.76 |

Numerical Example 6

Unit mm

Surface data

| Surface number | r | d | nd | vd |
|---|---|---|---|---|
| 1* | −35.464 | 1.00 | 1.85135 | 40.1 |
| 2* | 17.397 | 3.00 | | |
| 3* | 48.733 | 2.13 | 2.00178 | 19.3 |
| 4 | −403.311 | (variable) | | |
| 5 | 19.334 | 3.28 | 1.78123 | 45.0 |
| 6* | −71.269 | 0.50 | | |
| 7 | 17.130 | 2.98 | 1.61200 | 59.8 |
| 8 | −144.982 | 0.50 | 1.86117 | 25.8 |
| 9 | 15.626 | 2.83 | | |
| 10 (stop) | ∞ | (variable) | | |
| 11 | 27.447 | 2.78 | 1.52320 | 66.3 |
| 12* | −35.306 | (variable) | | |
| 13 | 34.124 | 2.00 | 1.48749 | 70.2 |
| 14 | ∞ | 1.59 | | |
| 15* | −15.350 | 0.70 | 1.85135 | 40.1 |
| 16* | 66.921 | (variable) | | |
| 17 | 65.899 | 4.00 | 1.58397 | 34.9 |
| 18 | −37.500 | (variable) | | |
| 19 | ∞ | 1.55 | 1.51633 | 64.1 |
| 20 | ∞ | 3.28 | | |
| Image plane | ∞ | | | |

-continued

Unit mm

Aspheric surface data

First surface

K = 0.00000e+000 A4 = 4.07185e−005 A6 = −1.60079e−007
A8 = 2.67875e−010
Second surface K = 0.00000e+000 A4 = −6.93744e−006 A6 = 1.82028e−007
A8 = −1.00570e−009
Third surface K = 0.00000e+000 A4 = −7.52104e−006 A6 = 1.55183e−007
A8 = −9.81019e−011
Fifth surface K = −1.01282e+000 A4 = 3.63605e−006 A6 = 8.60236e−009
Sixth surface K = 0.00000e+000 A4 = 8.93917e−006 A6 = 1.56591e−010
Twelfth surface K = 0.00000e+000 A6 = 9.71655e−008 A8 = 1.92771e−009
Fifteenth surface K = 0.00000e+000 A4 = −4.69887e−005 A6 = 2.05466e−006
A8 = −2.80158e−008
Sixteenth surface K = 0.00000e+000 A4 = −1.88640e−005 A6 = 1.53224e−006
A8 = −2.15089e−008

Various kinds of data
Zoom ratio 3.76

|  | Wide angle | Middle | Telephoto |
|---|---|---|---|
| Focal length | 12.84 | 22.87 | 48.27 |
| F-number | 2.80 | 3.50 | 5.00 |
| Half viewing angle | 35.54 | 24.58 | 13.12 |
| Image height | 9.17 | 10.46 | 11.25 |
| Total lens length | 74.36 | 66.00 | 71.01 |
| BF | 5.10 | 10.15 | 14.27 |
| d4 | 29.17 | 12.50 | 0.31 |
| d10 | 6.51 | 5.29 | 2.98 |
| d12 | 1.60 | 3.38 | 9.81 |
| d16 | 2.88 | 5.58 | 14.53 |
| d18 | 0.80 | 5.85 | 9.97 |

Zoom lens group data

| Lens group | Start surface | Focal length |
|---|---|---|
| 1 | 1 | −22.21 |
| 2 | 5 | 24.12 |
| 3 | 11 | 29.97 |
| 4 | 13 | −19.52 |
| 5 | 17 | 41.52 |

Numerical Example 7

Unit mm

Surface data

| Surface number | r | d | nd | vd |
|---|---|---|---|---|
| 1 | 42.265 | 1.10 | 1.92286 | 18.9 |
| 2 | 32.527 | 4.53 | 1.77250 | 49.6 |
| 3 | 700.098 | (variable) | | |
| 4 | −330.966 | 0.75 | 1.91082 | 35.3 |
| 5 | 13.514 | 5.69 | | |
| 6 | −31.424 | 0.62 | 1.71300 | 53.9 |
| 7 | 52.718 | 0.06 | | |
| 8 | 34.567 | 2.20 | 1.95906 | 17.5 |
| 9 | −371.970 | (variable) | | |
| 10* | 21.676 | 3.40 | 1.76802 | 49.2 |
| 11* | −111.562 | 0.10 | | |
| 12 | 10.873 | 3.15 | 1.48749 | 70.2 |
| 13 | 19.208 | 0.55 | 2.00069 | 25.5 |
| 14 | 10.897 | 3.00 | | |
| 15 | ∞ | 2.81 | | |
| 16 (stop) | ∞ | 2.17 | | |
| 17* | 16.483 | 2.10 | 1.65666 | 57.5 |
| 18* | 97.576 | 0.68 | | |
| 19 | 113.427 | 0.65 | 1.78729 | 26.8 |
| 20 | 31.310 | 3.05 | 1.48749 | 70.2 |
| 21 | −24.381 | (variable) | | |
| 22 | −101.118 | 0.50 | 1.68775 | 25.2 |
| 23 | 77.987 | (variable) | | |
| 24 | 146.046 | 1.41 | 1.98371 | 21.5 |
| 25 | 373.111 | 1.24 | | |
| 26* | −17.767 | 0.70 | 1.85135 | 40.1 |
| 27* | −256.907 | (variable) | | |
| 28 | 26.700 | 4.00 | 1.91082 | 35.3 |
| 29 | 200.000 | (variable) | | |
| 30 | ∞ | 1.55 | 1.51633 | 64.1 |
| 31 | ∞ | 3.31 | | |
| Image plane | ∞ | | | |

Aspheric surface data

Eleventh surface

K = 6.44838e−001 A4 = −2.81595e−005 A6 = 1.23110e−008
Twelfth surface

K = 0.00000e+000 A4 = −3.39988e−006 A6 = 6.59141e−008
Seventeenth surface

K = 0.00000e+000 A4 = 1.27131e−005 A6 = 5.30143e−007
A8 = 9.22300e−009
Eighteenth surface K = 0.00000e+000 A4 = 5.86535e−005 A6 = 7.68295e−007
A8 = 1.04881e−008
Twenty-sixth surface K = 0.00000e+000 A4 = 5.70292e−005 A6 = 9.78757e−007
A8 = −1.90373e−008
Twenty-seventh surface K = 0.00000e+000 A4 = 8.85609e−005 A6 = 2.76031e−007
A8 = −9.78185e−009

Various kinds of data
Zoom ratio 4.73

|  | Wide angle | Middle | Telephoto |
|---|---|---|---|
| Focal length | 12.84 | 22.93 | 60.74 |
| F-number | 2.06 | 3.50 | 4.02 |
| Half viewing angle | 35.53 | 24.53 | 10.49 |
| Image height | 9.17 | 10.46 | 11.25 |
| Total lens length | 81.50 | 83.38 | 100.93 |
| BF | 5.81 | 10.43 | 12.88 |
| d3 | 1.04 | 7.02 | 18.92 |
| d9 | 22.56 | 10.96 | 0.35 |
| d21 | 1.00 | 2.46 | 3.97 |
| d23 | 1.60 | 1.22 | 5.48 |
| d27 | 4.62 | 6.40 | 14.44 |
| d29 | 1.47 | 6.09 | 8.55 |

Zoom lens group data

| Lens group | Start surface | Focal length |
|---|---|---|
| 1 | 1 | 61.62 |
| 2 | 4 | −12.92 |
| 3 | 11 | 18.18 |

-continued

Unit mm

| | | |
|---|---|---|
| 4 | 22 | −63.95 |
| 5 | 24 | −25.00 |
| 6 | 28 | 33.46 |

Numerical Example 8

Unit mm

Surface data

| Surface number | r | d | nd | vd |
|---|---|---|---|---|
| 1 | 42.934 | 1.10 | 1.92286 | 18.9 |
| 2 | 32.950 | 4.75 | 1.77250 | 49.6 |
| 3 | 580.069 | (variable) | | |
| 4 | −513.829 | 0.75 | 1.91082 | 35.3 |
| 5 | 13.265 | 5.83 | | |
| 6 | −29.292 | 0.62 | 1.71300 | 53.9 |
| 7 | 64.060 | 0.06 | | |
| 8 | 38.538 | 2.20 | 1.95906 | 17.5 |
| 9 | −161.691 | (variable) | | |
| 10 | ∞ | −0.10 | | |
| 11* | 19.565 | 3.40 | 1.76802 | 49.2 |
| 12* | −158.134 | 0.10 | | |
| 13 | 11.551 | 3.15 | 1.48749 | 70.2 |
| 14 | 19.661 | 0.55 | 2.00069 | 25.5 |
| 15 | 10.935 | 5.29 | | |
| 16 (stop) | ∞ | (variable) | | |
| 17* | 16.975 | 2.10 | 1.69350 | 53.2 |
| 18* | 137.850 | 0.89 | | |
| 19 | −172.312 | 0.65 | 1.81650 | 24.2 |
| 20 | 45.566 | 3.05 | 1.48749 | 70.2 |
| 21 | −17.026 | (variable) | | |
| 22 | −23.910 | 0.50 | 1.65503 | 31.0 |
| 23 | −60.232 | (variable) | | |
| 24 | 145.122 | 1.41 | 1.97421 | 19.8 |
| 25 | 518.995 | 1.13 | | |
| 26* | −24.712 | 0.70 | 1.85135 | 40.1 |
| 27* | 75.920 | (variable) | | |
| 28 | 26.187 | 3.50 | 1.91082 | 35.3 |
| 29 | 200.000 | (variable) | | |
| 30 | ∞ | 1.55 | 1.51633 | 64.1 |
| 31 | ∞ | 3.31 | | |
| Image plane | ∞ | | | |

Aspheric surface data

Eleventh surface $K = 3.73281e-001$ $A4 = -2.87469e-005$ $A6 = -1.43879e-009$
Twelfth surface $K = 0.00000e+000$ $A4 = -7.10544e-006$ $A6 = 7.21597e-008$
Seventeenth surface $K = 0.00000e+000$ $A4 = 5.01704e-006$ $A6 = 5.36124e-007$
$A8 = 9.06625e-009$
Eighteenth surface $K = 0.00000e+000$ $A4 = 5.86535e-005$ $A6 = 7.68295e-007$
$A8 = 1.04881e-008$
Twenty-sixth surface $K = 0.00000e+000$ $A4 = 2.29362e-005$ $A6 = 1.01746e-006$
$A8 = -1.39431e-008$
Twenty-seventh surface $K = 0.00000e+000$ $A4 = 5.25145e-005$ $A6 = 5.24511e-007$
$A8 = -8.63217e-009$ Various kinds of data
Zoom ratio 4.73

-continued

Unit mm

| | Wide angle | Middle | Telephoto |
|---|---|---|---|
| Focal length | 12.84 | 22.90 | 60.72 |
| F-number | 2.06 | 3.50 | 4.00 |
| Half viewing angle | 35.53 | 24.55 | 10.50 |
| Image height | 9.17 | 10.46 | 11.25 |
| Total lens length | 81.50 | 82.98 | 100.71 |
| BF | 6.77 | 11.65 | 12.55 |
| d3 | 0.97 | 7.15 | 20.08 |
| d9 | 22.70 | 10.60 | 0.37 |
| d16 | 1.79 | 2.24 | 1.49 |
| d21 | 1.00 | 1.54 | 4.01 |
| d23 | 1.60 | 3.01 | 4.89 |
| d27 | 4.51 | 4.62 | 15.16 |
| d29 | 2.43 | 7.31 | 8.21 |

Zoom lens group data

| Lens group | Start surface | Focal length |
|---|---|---|
| 1 | 1 | 63.56 |
| 2 | 4 | −13.24 |
| 3 | 11 | 27.48 |
| 4 | 17 | 20.14 |
| 5 | 22 | −60.86 |
| 6 | 24 | −24.71 |
| 7 | 28 | 32.77 |

Numerical Example 9

Unit mm

Surface data

| Surface number | r | d | nd | vd |
|---|---|---|---|---|
| 1* | −48.464 | 1.00 | 1.85135 | 40.1 |
| 2* | 15.692 | 3.00 | | |
| 3* | 50.083 | 2.14 | 2.00178 | 19.3 |
| 4 | −350.000 | (variable) | | |
| 5 | ∞ | −0.10 | | |
| 6* | 19.235 | 3.03 | 1.76002 | 35.7 |
| 7* | −120.502 | 0.50 | | |
| 8 | 16.639 | 3.12 | 1.58868 | 61.2 |
| 9 | −436.095 | 0.50 | 1.87366 | 23.6 |
| 10 | 14.869 | 2.35 | | |
| 11 (stop) | ∞ | 7.58 | | |
| 12 | 26.441 | 3.70 | 1.60731 | 60.1 |
| 13* | −29.864 | (variable) | | |
| 14 | −19.155 | 1.00 | 1.69430 | 30.2 |
| 15 | −30.867 | (variable) | | |
| 16 | 37.080 | 1.78 | 1.58698 | 61.3 |
| 17 | 373.330 | 1.90 | | |
| 18* | −17.777 | 0.70 | 1.85135 | 40.1 |
| 19* | 131.738 | (variable) | | |
| 20 | 56.907 | 4.00 | 1.87803 | 35.3 |
| 21 | −65.228 | (variable) | | |
| 22 | ∞ | 1.55 | 1.51633 | 64.1 |
| 23 | ∞ | 2.32 | | |
| Image plane | ∞ | | | |

Aspheric surface data

First surface $K = 0.00000e+000$ $A4 = 1.69508e-005$ $A6 = -8.67214e-008$
$A8 = 1.54993e-010$
Second surface $K = 0.00000e+000$ $A4 = -1.86267e-005$ $A6 = 9.27956e-009$
$A8 = -8.21305e-010$ -continued Unit mm Third surface K = 0.00000e+000 A4 = 4.63009e−006 A6 = 7.80328e−008
A8 = −4.81936e−011
Sixth surface K = −9.57758e−001 A4 = 7.20168e−006 A6 = −3.33350e−008
Seventh surface K = 0.00000e+000 A4 = 8.57196e−006 A6 = −4.53608e−008
Thirteenth surface K = 0.00000e+000 A6 = 4.26293e−008 A8 = 3.59218e−010
Eighteenth surface K = 0.00000e+000 A4 = −2.85668e−006 A6 = 1.21173e−006
A8 = −1.00968e−008
Nineteenth surface K = 0.00000e+000 A4 = 9.91742e−006 A6 = 8.92744e−007
A8 = −8.10319e−009

Various kinds of data
Zoom ratio 3.76

|  | Wide angle | Middle | Telephoto |
|---|---|---|---|
| Focal length | 12.88 | 22.96 | 48.46 |
| F-number | 2.80 | 3.50 | 5.00 |
| Half viewing angle | 35.45 | 24.50 | 13.07 |
| Image height | 9.17 | 10.46 | 11.25 |
| Total lens length | 79.20 | 69.98 | 80.16 |
| BF | 5.14 | 10.30 | 11.72 |
| d4 | 29.95 | 11.47 | 0.39 |
| d13 | 2.14 | 2.60 | 5.12 |
| d15 | 2.57 | 5.60 | 10.68 |
| d19 | 2.68 | 3.27 | 15.52 |
| d21 | 1.80 | 6.96 | 8.38 |

Zoom lens group data

| Lens group | Start surface | Focal length |
|---|---|---|
| 1 | 1 | −22.65 |
| 2 | 6 | 20.35 |
| 3 | 14 | −75.34 |
| 4 | 16 | −26.52 |
| 5 | 20 | 35.15 |

Numerical Example 10

Unit mm
Surface data

| Surface number | r | d | nd | νd |
|---|---|---|---|---|
| 1* | −38.276 | 1.00 | 1.85135 | 40.1 |
| 2* | 16.381 | 3.00 |  |  |
| 3* | 48.915 | 2.13 | 2.00178 | 19.3 |
| 4 | −350.000 | (variable) |  |  |
| 5 | ∞ | −0.10 |  |  |
| 6* | 21.227 | 3.16 | 1.76773 | 42.1 |
| 7* | −78.169 | 0.50 |  |  |
| 8 | 15.085 | 3.05 | 1.59895 | 60.6 |
| 9 | 255.766 | 0.50 | 1.86464 | 25.2 |
| 10 | 14.543 | 4.83 |  |  |
| 11 (stop) | ∞ | (variable) |  |  |
| 12 | 26.392 | 3.10 | 1.61004 | 58.5 |
| 13* | −26.476 | (variable) |  |  |
| 14 | −18.482 | 1.00 | 1.84792 | 31.1 |
| 15 | −42.460 | (variable) |  |  |
| 16 | 32.191 | 1.78 | 1.48749 | 70.2 |
| 17 | 557.900 | 1.36 |  |  |
| 18* | −26.567 | 0.70 | 1.85135 | 40.1 |
| 19* | 43.595 | (variable) |  |  |
| 20 | 58.781 | 4.00 | 1.92850 | 32.3 |
| 21 | −60.350 | (variable) |  |  |
| 22 | ∞ | 1.55 | 1.51633 | 64.1 |
| 23 | ∞ | 3.31 |  |  |
| Image plane | ∞ |  |  |  |

Aspheric surface data

First surface

K = 0.00000e+000 A4 = 4.00823e−005 A6 = −1.57006e−007
A8 = 2.26494e−010
Second surface K = 0.00000e+000 A4 = −1.03596e−005 A6 = 2.20297e−007
A8 = −1.61008e−009
Third surface K = 0.00000e+000 A4 = −5.52506e−006 A6 = 1.62466e−007
A8 = −2.01311e−010
Sixth surface K = −1.09851e+000 A4 = 1.73912e−006 A6 = 2.45034e−008
Seventh surface K = 0.00000e+000 A4 = 4.19774e−006 A6 = 2.73507e−008
Thirteenth surface K = 0.00000e+000 A6 = 5.73630e−008 A8 = 9.30443e−010
Eighteenth surface K = 0.00000e+000 A4 = −5.29800e−005 A6 = 1.42281e−006
A8 = −1.73106e−008
Nineteenth surface K = 0.00000e+000 A4 = −1.26377e−005 A6 = 1.14150e−006
A8 = −1.34628e−008

Various kinds of data
Zoom ratio 3.78

|  | Wide angle | Middle | Telephoto |
|---|---|---|---|
| Focal length | 12.87 | 22.92 | 48.65 |
| F-number | 2.80 | 3.50 | 5.00 |
| Half viewing angle | 35.47 | 24.54 | 13.02 |
| Image height | 9.17 | 10.46 | 11.25 |
| Total lens length | 77.15 | 67.47 | 75.21 |
| BF | 5.14 | 10.82 | 12.41 |
| d4 | 29.10 | 11.05 | 0.23 |
| d11 | 5.86 | 4.51 | 2.38 |
| d13 | 1.92 | 2.75 | 5.07 |
| d15 | 1.60 | 4.12 | 10.27 |
| d19 | 2.99 | 3.67 | 14.30 |
| d21 | 0.80 | 6.49 | 8.07 |

Zoom lens group data

| Lens group | Start surface | Focal length |
|---|---|---|
| 1 | 1 | −21.82 |
| 2 | 6 | 25.86 |
| 3 | 12 | 22.16 |
| 4 | 14 | −39.35 |
| 5 | 16 | −28.19 |
| 6 | 20 | 32.60 |

TABLE 1-1

|  | First exemplary embodiment | Second exemplary embodiment | Third exemplary embodiment | Fourth exemplary embodiment | Fifth exemplary embodiment |
|---|---|---|---|---|---|
| (RF − RR)/(RF + RR) | 1.30 | 50.00 | 100.00 | 100.00 | 1.00 |
| (Drt − Dft)/(Drw − Dfw) | 1.18 | 0.86 | 0.56 | 0.93 | 7.27 |
| (Ra − Rb)/(Ra + Rb) | −2.01 | −6.29 | −6.39 | −24.56 | 49.69 |
| (Rc − Rd)/(Rc + Rd) | 0.42 | 0.13 | 0.13 | 0.12 | 0.62 |
| fnp/fnn | −3.85 | −7.12 | −7.47 | −4.49 | −4.55 |
| Dft/Drt | 0.74 | 0.81 | 0.87 | 0.81 | 0.71 |
| Dfw/Drw | 0.37 | 0.36 | 0.36 | 0.36 | 1.26 |
| fair/fn | 0.80 | 0.86 | 0.87 | 0.75 | 0.77 |
| fp/fn | −1.36 | −1.35 | −1.32 | −1.22 | −1.70 |

TABLE 1-2

|  | Sixth exemplary embodiment | Seventh exemplary embodiment | Eighth exemplary embodiment | Ninth exemplary embodiment | Tenth exemplary embodiment |
|---|---|---|---|---|---|
| (RF − RR)/(RF + RR) | 1.00 | 1.10 | 1.10 | 1.10 | 1.10 |
| (Drt − Dft)/(Drw − Dfw) | 3.69 | 2.97 | 3.53 | 42.91 | 2.91 |
| (Ra − Rb)/(Ra + Rb) | 58.75 | −0.30 | −2.42 | −10.94 | 7.27 |
| (Rc − Rd)/(Rc + Rd) | 0.01 | 1.23 | 0.49 | 0.40 | −0.15 |
| fnp/fnn | −4.79 | −10.83 | −9.46 | −3.81 | −3.63 |
| Dft/Drt | 0.68 | 0.38 | 0.32 | 0.69 | 0.72 |
| Dfw/Drw | 0.56 | 0.35 | 0.36 | 0.96 | 0.54 |
| fair/fn | 0.92 | 0.79 | 1.11 | 0.76 | 1.08 |
| fp/fn | −2.13 | −1.34 | −1.33 | −1.33 | −1.16 |

Next, an exemplary embodiment of a digital still camera in which at least one zoom lens described in the foregoing exemplary embodiments is used as an imaging optical system will be described below with reference to FIG. 21.

The still camera illustrated in FIG. 21 includes a camera body 10, an imaging optical system 11, a solid-state image sensor (photoelectric conversion element) 12, a memory 13, and a viewfinder 14. The imaging optical system 11 includes a zoom lens according to any one of the first to tenth exemplary embodiments. The solid-state image sensor 12, such as, but not limited to, a CCD sensor and a CMOS sensor, is mounted inside the camera body 10 and receives an object image formed by the imaging optical system 11. The memory 13 stores information corresponding to an object image which has been photoelectrically converted by the solid-state image sensor 12. The viewfinder 14, which includes a liquid crystal display panel, is used in observing an object image formed on the solid-state image sensor 12.

Consequently, by applying a zoom lens according to any exemplary embodiment of the present inventions to an imaging apparatus such as, but not limited to, a digital still camera, an imaging apparatus which has a compact size, a high resolution, and high optical performance over the entire zoom range is obtained.

While the present inventions have been described with reference to exemplary embodiments, it is to be understood that the inventions are not limited to the disclosed exemplary embodiments. The scope of the following claims is to be accorded the broadest interpretation so as to encompass all such modifications and equivalent structures and functions.

This application claims the benefit of Japanese Patent Application No. 2014-017755, filed Jan. 31, 2014, which is hereby incorporated by reference herein in its entirety.

What is claimed is:

1. A zoom lens comprising:
a first lens group;
a second lens group, on an image side of the first lens group;
a focus lens group having a negative refractive power, and configured to move during focusing, wherein the focus lens group is on an image side of the second lens group, and
a positive lens group having a positive refractive power and arranged adjacent to the focus lens group on an image side of the focus lens group, wherein the positive lens group includes one or more lenses, wherein the focus lens group includes, in order from an object side of the focus lens group to the image side of the focus lens group, a positive lens and a negative lens, wherein a distance between lens groups of the zoom lens arranged adjacent to each other changes for zooming and/or focusing, and wherein the following conditions are satisfied:

$$0.50<(RF-RR)/(RF+RR)<200.00, \text{ and}$$

$$|RR|<|RF|$$

where RR represents a curvature radius of an object-side surface of the negative lens included in the focus lens group, and RF represents a curvature radius of an image-side surface of the positive lens included in the focus lens group.

2. The zoom lens according to claim 1, wherein the positive lens group is configured to move during zooming.

3. The zoom lens according to claim 1, wherein the focus lens group consists of the positive lens and the negative lens.

4. The zoom lens according to claim 1, wherein the following condition is satisfied:

$$0.00<(Drt-Dft)/(Drw-Dfw)<85.00$$

where,

Drw represents a distance along an optical axis, at a wide-angle end, between the positive lens group and the focus lens group, Dfw represents a distance along the optical axis, at the wide-angle end, between the focus lens group and a lens group arranged adjacent on the object side of the focus lens group, Drt represents a distance along the optical axis, at a telephoto end, between the positive lens group and the focus lens group, and Dft represents a distance along the optical axis, at the telephoto end, between the focus lens group and a lens group arranged adjacent on the object side of the focus lens group.

5. The zoom lens according to claim 1, wherein the following condition is satisfied:

$$-50.0<(Ra-Rb)/(Ra+Rb)<120.0$$

where,

Ra represents a curvature radius of a most-image-side lens surface in a lens group arranged adjacent to the focus lens group on the object side of the focus lens group, and Rb represents a curvature radius of a most-object-side lens surface in the focus lens group.

6. The zoom lens according to claim 1, wherein the following condition is satisfied:

$$-0.30<(Rc-Rd)/(Rc+Rd)<2.50$$

where,

Rc represents a curvature radius of a most-image-side lens surface in the focus lens group, and Rd represents a curvature radius of a most-object-side lens surface in the positive lens group.

7. The zoom lens according to claim 1, wherein the following condition is satisfied:

$$-21.0<fnp/fnn<-2.5$$

where, fnp represents a focal length of the positive lens included in the focus lens group, and fnn represents a focal length of the negative lens included in the focus lens group.

8. The zoom lens according to claim 1, wherein the following condition is satisfied:

$$0.10<Dft/Drt<1.80$$

where,

Drt represents a distance along an optical axis, at a telephoto end, between the positive lens group and the focus lens group, and Dft represents a distance along the optical axis, at the telephoto end, between the focus lens group and a lens group arranged adjacent on the object side of the focus lens group.

9. The zoom lens according to claim 1, wherein the following condition is satisfied:

$$0.10<Dfw/Drw<2.60$$

where,

Drw represents a distance along an optical axis, at a wide-angle end, between the positive lens group and the focus lens group, and Dfw represents a distance along the optical axis, at the wide-angle end, between the focus lens group and a lens group arranged adjacent on the object side of the focus lens group.

10. The zoom lens according to claim 1, wherein the following condition is satisfied:

$$0.30<\text{fair}/fn<2.30$$

where, fair represents a focal length of an air lens formed between the image-side surface of the positive lens included in the focus lens group and the object-side surface of the negative lens included in the focus lens group, and fn represents a focal length of the focus lens group.

11. The zoom lens according to claim 1, wherein the following condition is satisfied:

$$-4.20<fp/fn<-0.50$$

where, fp represents a focal length of the positive lens group, and fn represents the focal length of the focus lens group.

12. The zoom lens according to claim 1, further comprising an aperture stop arranged on the object side relative to the focus lens group.

13. The zoom lens according to claim 1, further comprising, in order from an object side of the zoom lens to an image side of the zoom lens:

the first lens group having a positive refractive power;
the second lens group having a negative refractive power;
a third lens group having a positive refractive power; and
a fourth lens group having a positive refractive power,
wherein the focus lens group is a fifth lens group disposed or located after the fourth lens group on an image side of the fourth lens group and the positive lens group is a sixth lens group disposed or located after the focus lens group.

14. The zoom lens according to claim 1, further comprising, in order from an object side of the zoom lens to an image side of the zoom lens:

the first lens group having a positive refractive power;
the second lens group having a negative refractive power; and
a third lens group having a positive refractive power,
wherein the focus lens group is a fourth lens group disposed or located after the third lens group on an image side of the third lens group and the positive lens group is a fifth lens group disposed or located after the focus lens group.

15. The zoom lens according to claim 1, further comprising, in order from an object side of the zoom lens to an image side of the zoom lens:
the first lens group having a negative refractive power; and
the second lens group having a positive refractive power,
wherein the focus lens group is a third lens group disposed or located after the second lens group on an image side of the second lens group and the positive lens group is a fourth lens group disposed or located after the focus lens group.

16. The zoom lens according to claim 1, further comprising, in order from an object side of the zoom lens to an image side of the zoom lens:
the first lens group having a negative refractive power;
the second lens group having a positive refractive power; and
a third lens group having a positive refractive power,
wherein the focus lens group is a fourth lens group disposed or located after the third lens group on an image side of the third lens group and the positive lens group is a fifth lens group disposed or located after the focus lens group.

17. The zoom lens according to claim 1, further comprising, in order from an object side of the zoom lens to an image side of the zoom lens:
the first lens group having a positive refractive power;
the second lens group having a negative refractive power;
a third lens group having a positive refractive power; and
a fourth lens group having a negative refractive power,
wherein the focus lens group is a fifth lens group disposed or located after the fourth lens group on an image side of the fourth lens group and the positive lens group is a sixth lens group disposed or located after the focus lens group.

18. The zoom lens according to claim 1, further comprising, in order from an object side of the zoom lens to an image side of the zoom lens:
the first lens group having a positive refractive power;
the second lens group having a negative refractive power;
a third lens group having a positive refractive power;
a fourth lens group having a positive refractive power; and
a fifth lens group having a negative refractive power,
wherein the focus lens group is a sixth lens group disposed or located after the fifth lens group on an image side of the fifth lens group and the positive lens group is a seventh lens group disposed or located after the focus lens group.

19. The zoom lens according to claim 1, further comprising, in order from an object side of the zoom lens to an image side of the zoom lens:
the first lens group having a negative refractive power;
the second lens group having a positive refractive power; and
a third lens group having a negative refractive power,
wherein the focus lens group is a fourth lens group disposed or located after the third lens group on an image side of the third lens group and the positive lens group is a fifth lens group disposed or located after the focus lens group.

20. The zoom lens according to claim 1, further comprising, in order from an object side of the zoom lens to an image side of the zoom lens:
the first lens group having a negative refractive power;
the second lens group having a positive refractive power;
a third lens group having a positive refractive power; and
a fourth lens group having a negative refractive power,
wherein the focus lens group is a fifth lens group disposed or located after the fourth lens group on an image side of the fourth lens group and the positive lens group is a sixth lens group disposed or located after the focus lens group.

21. The zoom lens according to claim 1, wherein the zoom lens is configured to form an image on a solid-state image sensor.

22. An imaging apparatus comprising:
a zoom lens; and
an image sensor configured to receive an image formed by the zoom lens,
wherein the zoom lens comprises:
a first lens group;
a second lens group, on an image side of the first lens group;
a focus lens group, on an image side of the second lens group; and
a positive lens group;
wherein the focus lens group has a negative refractive power, and is configured to move during focusing, and
wherein the positive lens group has a positive refractive power and is arranged adjacent to the focus lens group on an image side of the focus lens group, wherein the positive lens group includes one or more lenses,
wherein the focus lens group includes, in order from an object side of the focus lens group to the image side of the focus lens group, a positive lens and a negative lens,
wherein a distance between lens groups of the zoom lens arranged adjacent to each other changes for zooming and/or focusing, and
wherein the following conditions are satisfied:

$0.50 < (RF-RR)/(RF+RR) < 200.00$, and $|RR| < |RF|$ where RR represents a curvature radius of an object-side surface of the negative lens included in the focus lens group, and RF represents a curvature radius of an image-side surface of the positive lens included in the focus lens group.

* * * * *